(12) United States Patent
Ikeuchi et al.

(10) Patent No.: US 7,890,255 B2
(45) Date of Patent: Feb. 15, 2011

(54) NAVIGATION APPARATUS

(75) Inventors: Tomoya Ikeuchi, Tokyo (JP); Masaharu Umezu, Tokyo (JP); Makoto Mikuriya, Tokyo (JP); Mitsuo Shimotani, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 899 days.

(21) Appl. No.: 10/892,473

(22) Filed: Jul. 16, 2004

(65) Prior Publication Data
US 2005/0049784 A1  Mar. 3, 2005

(30) Foreign Application Priority Data
Aug. 29, 2003  (JP) .............................. 2003-306972

(51) Int. Cl.
G01C 21/32 (2006.01)
G01C 21/30 (2006.01)
G06F 17/00 (2006.01)

(52) U.S. Cl. .......................... 701/208; 701/1; 701/212; 340/995.1; 340/995.14; 340/995.16; 340/995.18; 717/168; 717/169; 717/170; 717/174; 717/175; 707/200; 707/203; 434/111

(58) Field of Classification Search ................. 701/208, 701/213, 212, 1; 340/995.1–995.12, 995.14–995.16, 340/995.18, 995, 14; 717/168–178; 707/200, 707/203; 434/111
See application file for complete search history.

(56) References Cited

U.S. PATENT DOCUMENTS

| | | | |
|---|---|---|---|
| 5,450,589 A * | 9/1995 | Maebayashi et al. | 717/170 |
| 5,684,989 A * | 11/1997 | Nissato | 707/201 |
| 5,893,113 A * | 4/1999 | McGrath et al. | 707/200 |
| 6,075,467 A * | 6/2000 | Ninagawa | 340/995.14 |
| 6,230,098 B1 * | 5/2001 | Ando et al. | 701/208 |

(Continued)

FOREIGN PATENT DOCUMENTS

DE  19837618 A1  3/1999

(Continued)

OTHER PUBLICATIONS

German Office Action corresponding to German Patent Application No. 102004040381.3 May 21, 2010.

(Continued)

*Primary Examiner*—Jack Keith
*Assistant Examiner*—Chuong P Nguyen
(74) *Attorney, Agent, or Firm*—Sughrue Mion, PLLC

(57) ABSTRACT

A map information processing apparatus includes a map information storage unit (15) for storing map information, a map update information storage unit (8) for storing one or more pieces of map update information (30 to 32) used for updating yet-to-be-updated map information, a map update information selection unit (19) for selecting one or more pieces of map update information required to update the map information stored in the map information storage unit (15) from the one or more pieces of map update information stored in the map update information storage unit, and a map information updating unit (20) for updating the map information stored in the map information storage unit (15) by applying the one or more pieces of map update information selected by the map update information selection unit to the map information one by one in order of updating.

3 Claims, 21 Drawing Sheets

U.S. PATENT DOCUMENTS

| | | | | |
|---|---|---|---|---|
| 6,282,492 | B1* | 8/2001 | Gorai et al. | 701/209 |
| 6,453,233 | B1* | 9/2002 | Kato | 701/208 |
| 6,546,334 | B1* | 4/2003 | Fukuchi et al. | 701/208 |
| 6,567,742 | B2 | 5/2003 | Umezu et al. | |
| 6,643,584 | B1* | 11/2003 | Ikeuchi et al. | 701/209 |
| 6,728,633 | B2 | 4/2004 | Mikuriya et al. | |
| 6,823,255 | B2* | 11/2004 | Ahrens et al. | 701/200 |
| 6,879,909 | B2* | 4/2005 | Hirano et al. | 701/208 |
| 7,136,748 | B2 | 11/2006 | Umezu et al. | |
| 2001/0004724 | A1* | 6/2001 | Nagaki | 701/208 |

FOREIGN PATENT DOCUMENTS

| | | |
|---|---|---|
| JP | 09145383 A | 6/1997 |
| JP | 11065436 A | 3/1999 |
| JP | 11095657 A | 4/1999 |
| JP | 2001075967 A | 3/2001 |
| JP | 2001109372 A | 4/2001 |
| JP | 2002-296042 A | 10/2002 |
| JP | 2003306972 A | 10/2003 |

OTHER PUBLICATIONS

Japanese Office Action with Partial Translation dated Mar. 16, 2010 corresponding to Japanese Application No. 2003-306972.

Partial Translation of JP 2001109372A cited in IDS filed of May 6, 2009 considered by the Examiner on Jun. 22, 2009.

Partial Translation of JP2001075967A cited in IDS submitted on May 6, 2009 considered by the Examiner on Jun. 22, 2009.

Partial Translation of JP 11095657A previously cited in an IDS filed on May 6, 2009 considered by the Examiner on Jun. 22, 2009.

* cited by examiner

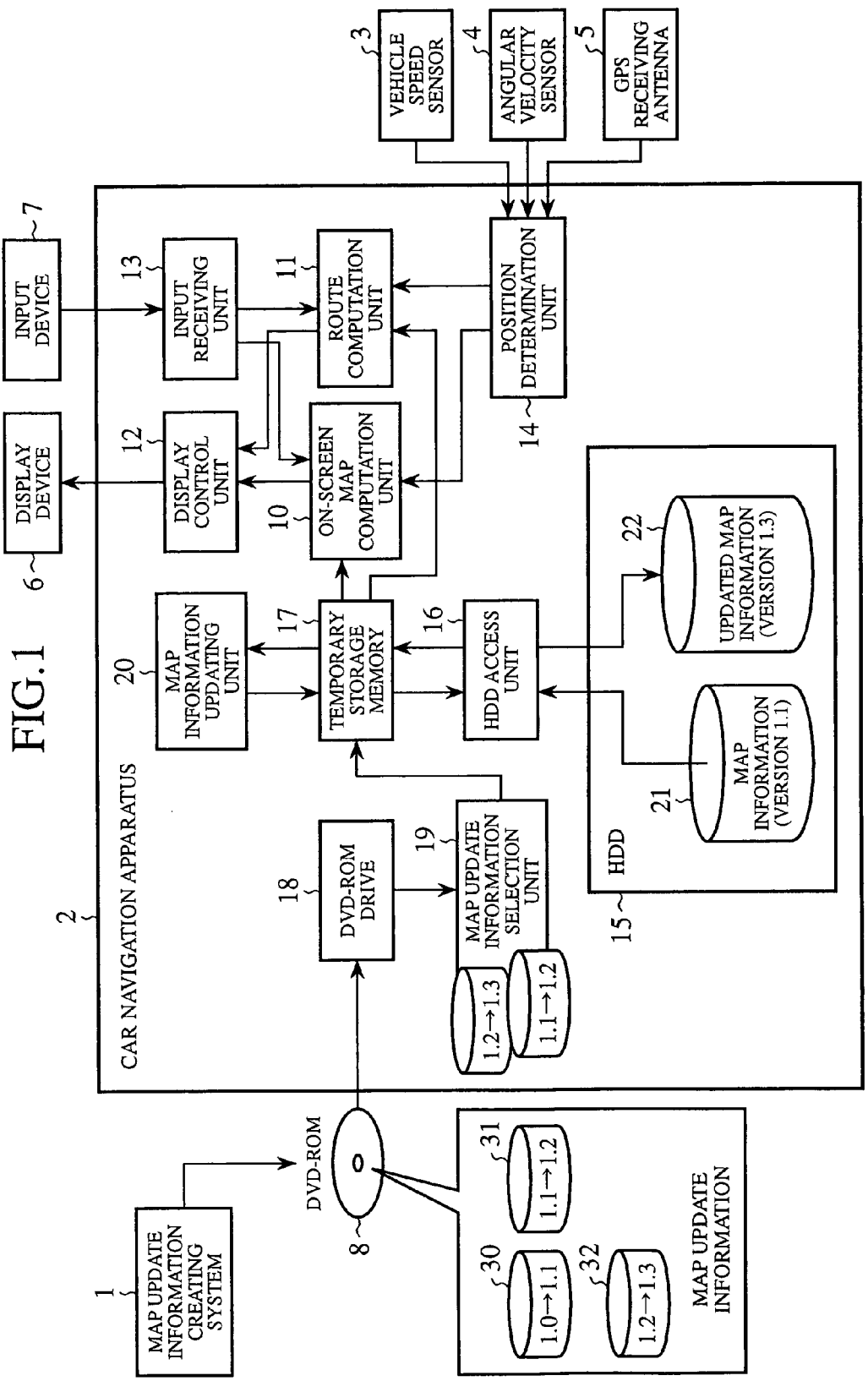

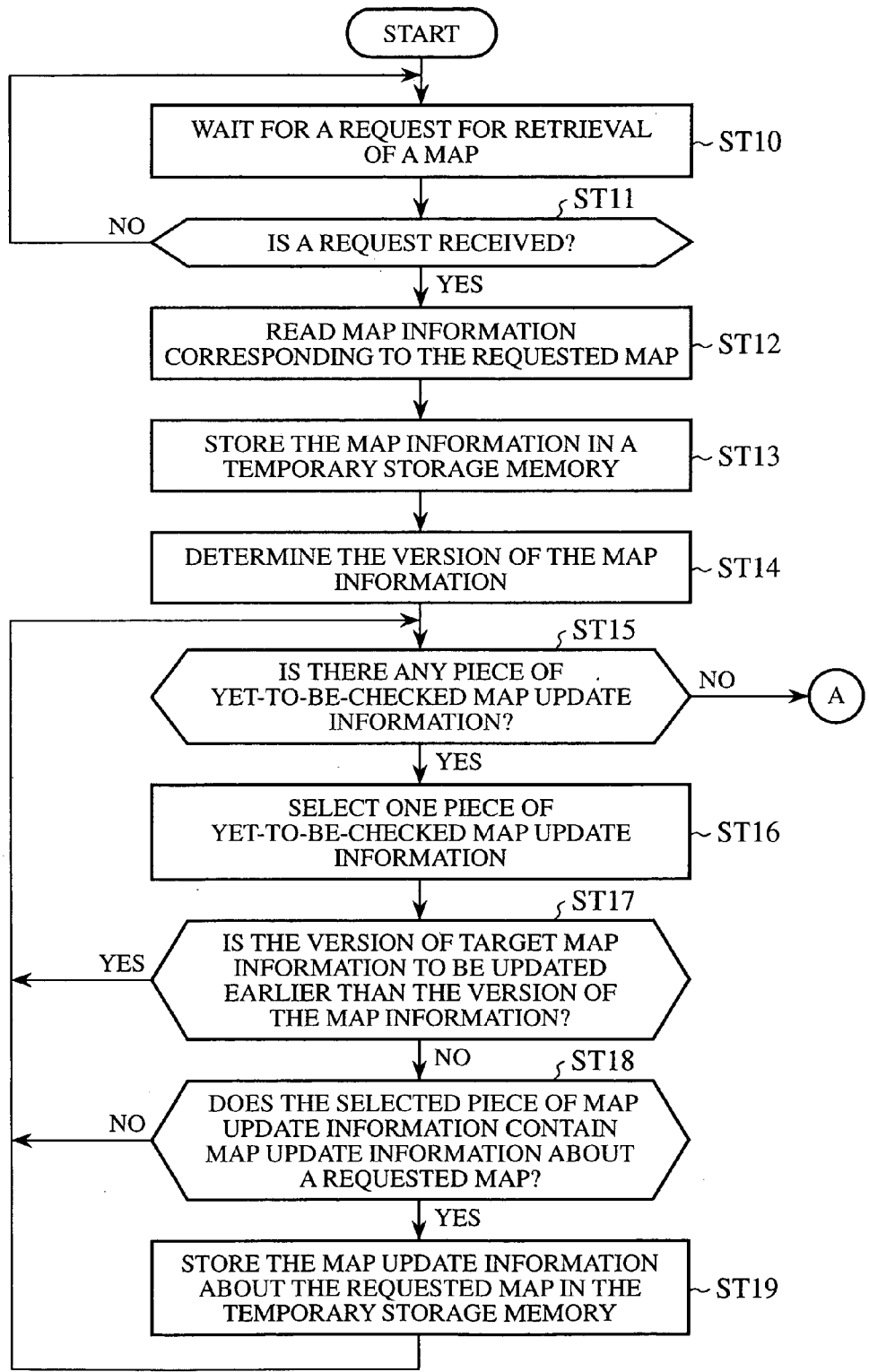

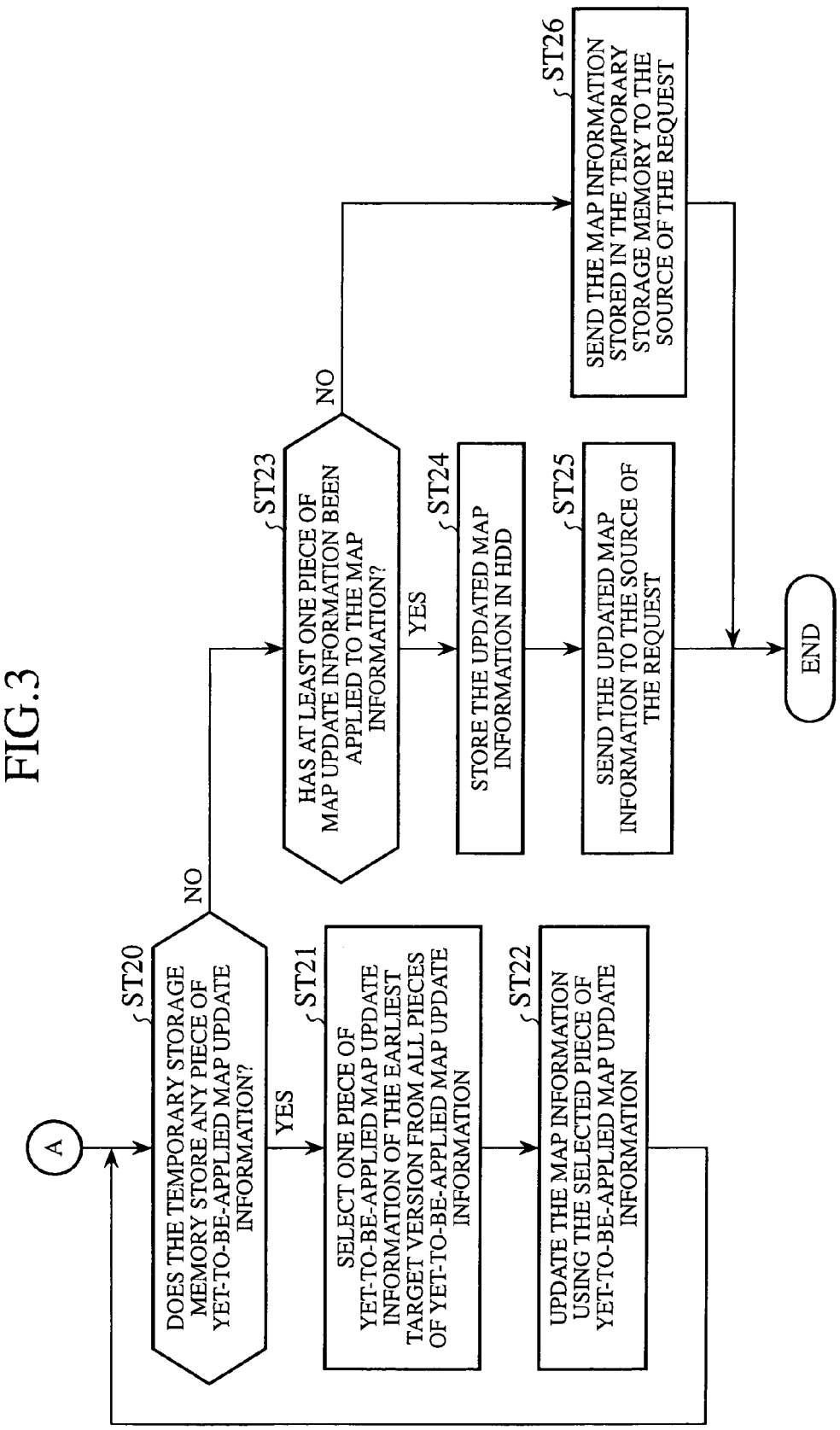

FIG.4A  MAP INFORMATION (VERSION 1.1)
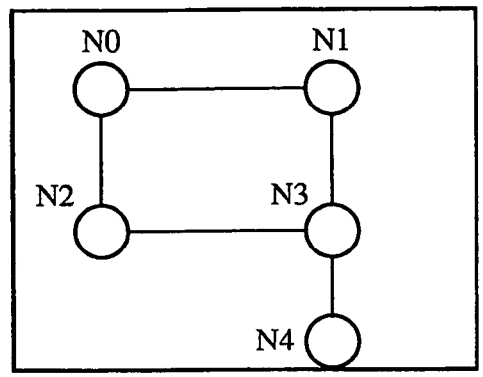
FIG.4B  MAP INFORMATION (VERSION 1.2)
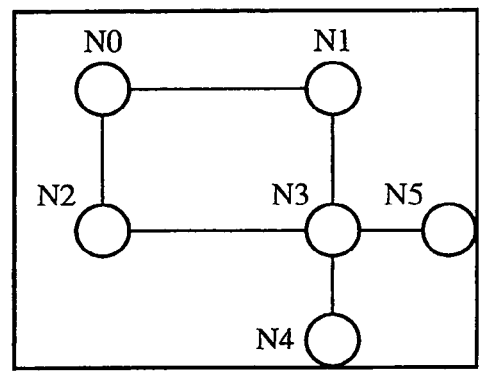
FIG.4C  MAP INFORMATION (VERSION 1.3)
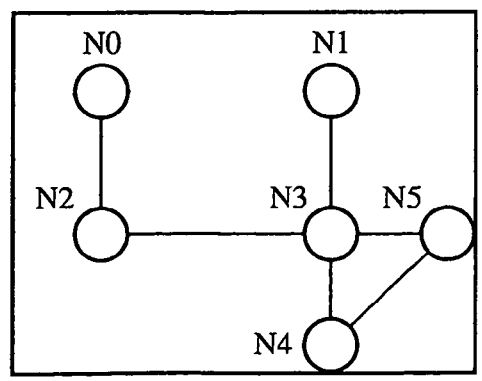

FIG.5

FIG.6A
MAP INFORMATION
(VERSION 1.1)
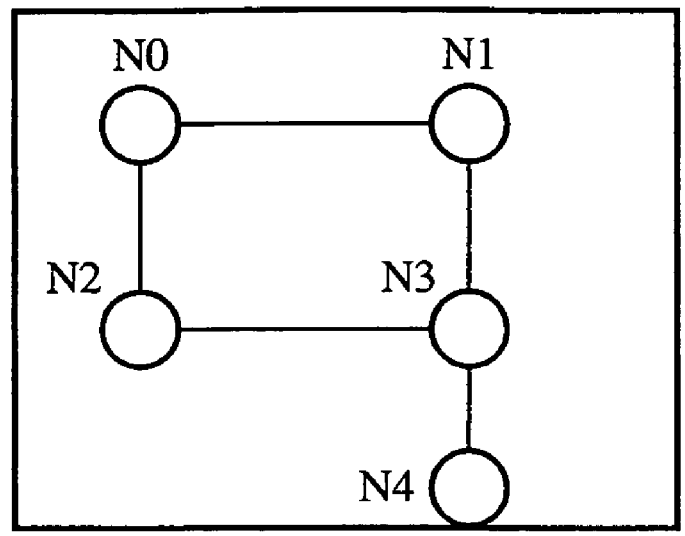
FIG.6B
MAP INFORMATION
(VERSION 1.2)
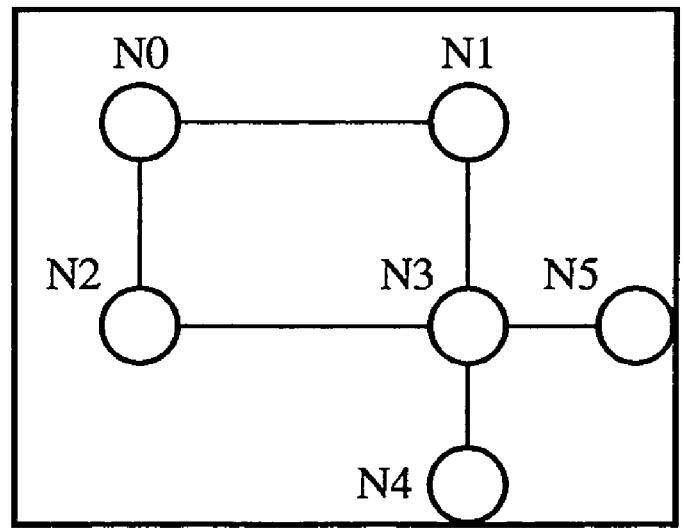

FIG. 7

(A) MAP INFORMATION OF VERSION 1.1 (DETAILS)

NODE RECORD GROUP:

| | | | | | |
|---|---|---|---|---|---|
| #0 | 2 | x0 | y0 | ... | Ofs(L#0) |
| #1 | 2 | x1 | y1 | ... | Ofs(L#2) |
| #2 | 2 | x2 | y2 | ... | Ofs(L#4) |
| #3 | 3 | x3 | y3 | ... | Ofs(L#6) |
| #4 | 1 | x4 | y4 | ... | Ofs(L#9) |

LINK RECORD GROUP:

| | | | | | |
|---|---|---|---|---|---|
| #0 | N1 | VALID | ... | 0 |
| #1 | N2 | VALID | ... | 1 |
| #2 | N0 | VALID | ... | 0 |
| #3 | N3 | VALID | ... | 3 |
| #4 | N0 | VALID | ... | 2 |
| #5 | N3 | VALID | ... | 4 |
| #6 | N1 | VALID | ... | 3 |
| #7 | N2 | VALID | ... | 4 |
| #8 | N4 | VALID | ... | 5 |
| #9 | N3 | VALID | ... | 5 |

COST RECORD GROUP:

| | | | | | |
|---|---|---|---|---|---|
| #0 | N0 | 100 | BOTH | ... | C01 |
| #1 | N0 | 101 | FORWARD | ... | C02 |
| #2 | N0 | 101 | BACKWARD | ... | C20 |
| #3 | N1 | 102 | BOTH | ... | C13 |
| #4 | N2 | 103 | BOTH | ... | C23 |
| #5 | N3 | 104 | BOTH | ... | C34 |

(B) MAP INFORMATION OF VERSION 1.2 (DETAILS)

| | | | | | |
|---|---|---|---|---|---|
| #0 | 2 | x0 | y0 | ... | Ofs(L#0) |
| #1 | 2 | x1 | y1 | ... | Ofs(L#2) |
| #2 | 2 | x2 | y2 | ... | Ofs(L#4) |
| #3 | 3 | x3 | y3 | ... | Ofs(L#6) |
| #4 | 1 | x4 | y4 | ... | Ofs(L#9) |

| | | | | | |
|---|---|---|---|---|---|
| #0 | N1 | VALID | ... | 0 |
| #1 | N2 | VALID | ... | 1 |
| #2 | N0 | VALID | ... | 0 |
| #3 | N3 | VALID | ... | 3 |
| #4 | N0 | VALID | ... | 2 |
| #5 | N3 | VALID | ... | 4 |
| #6 | N1 | VALID | ... | 3 |
| #7 | N2 | VALID | ... | 4 |
| #8 | N4 | VALID | ... | 5 |
| #9 | N3 | VALID | ... | 5 |

| | | | | | |
|---|---|---|---|---|---|
| #0 | N0 | 100 | BOTH | ... | C01 |
| #1 | N0 | 101 | FORWARD | ... | C02 |
| #2 | N0 | 101 | BACKWARD | ... | C20 |
| #3 | N1 | 102 | BOTH | ... | C13 |
| #4 | N2 | 103 | BOTH | ... | C23 |
| #5 | N3 | 104 | BOTH | ... | C34 |

UPDATE RECORD GROUP:

| | | | | | |
|---|---|---|---|---|---|
| #0 | 4 | x3 | y3 | ... | Ofs(L#6) |
| #1 | 1 | x4 | y4 | ... | Ofs(L#10) |
| #2 | 1 | x5 | y5 | ... | Ofs(L#11) |
| #3 | N5 | VALID | ... | 6 |
| #4 | N3 | VALID | ... | 6 |
| #5 | N3 | 200 | BOTH | ... | C35 |

(C) REFERENCE TABLE (FOR UPDATING VERSION 1.1 TO 1.2)

| | DATA TYPE | UPDATE TYPE | TARGET RECORD NUMBER | RECORD-TO-BE-UPDATED NUMBER |
|---|---|---|---|---|
| #0 | N | M | 3 | 0 |
| #1 | N | M | 4 | 1 |
| #2 | N | A | F | 2 |
| #3 | L | A | 9 | 3 |
| #4 | L | A | F | 4 |
| #5 | C | A | F | 5 |

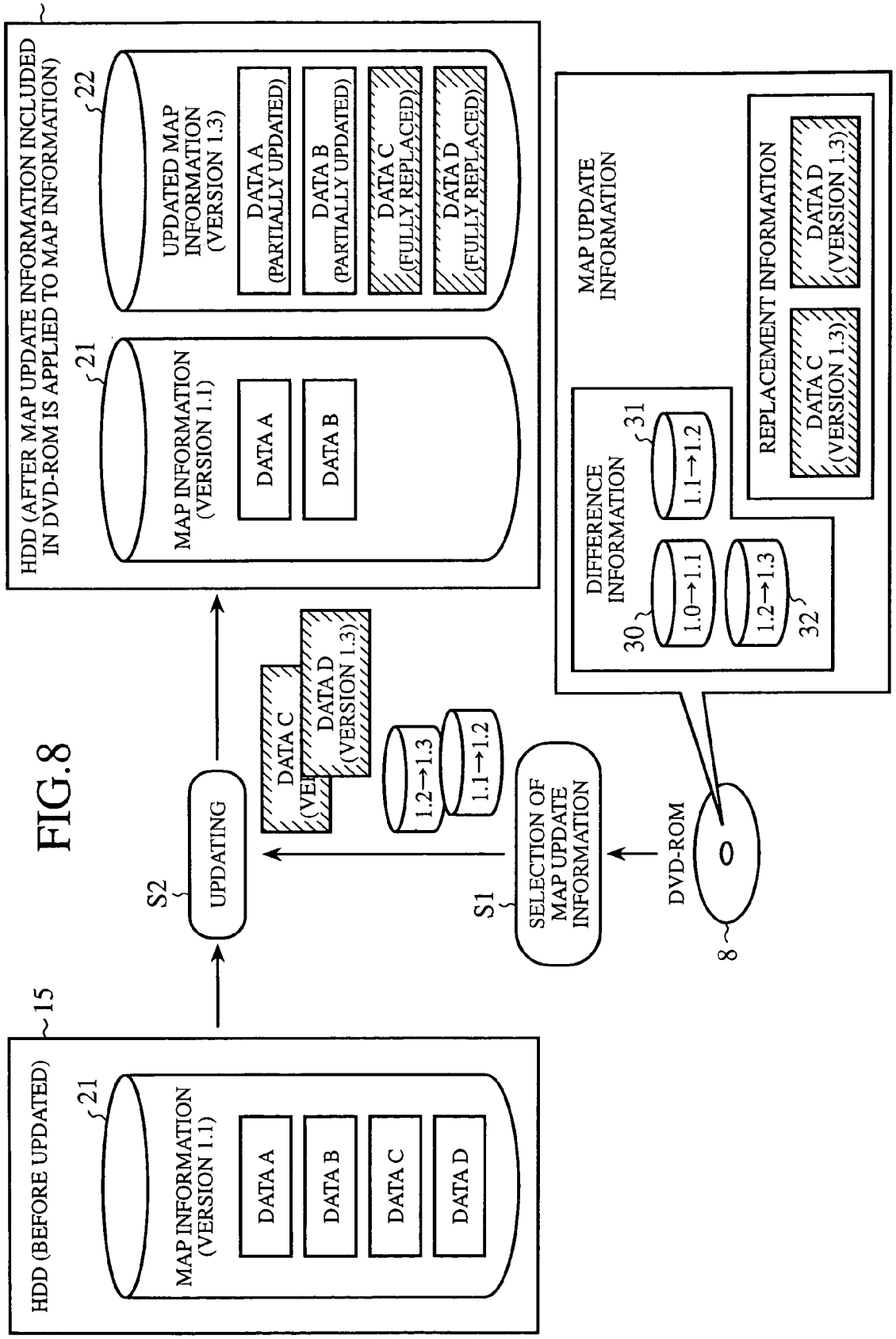

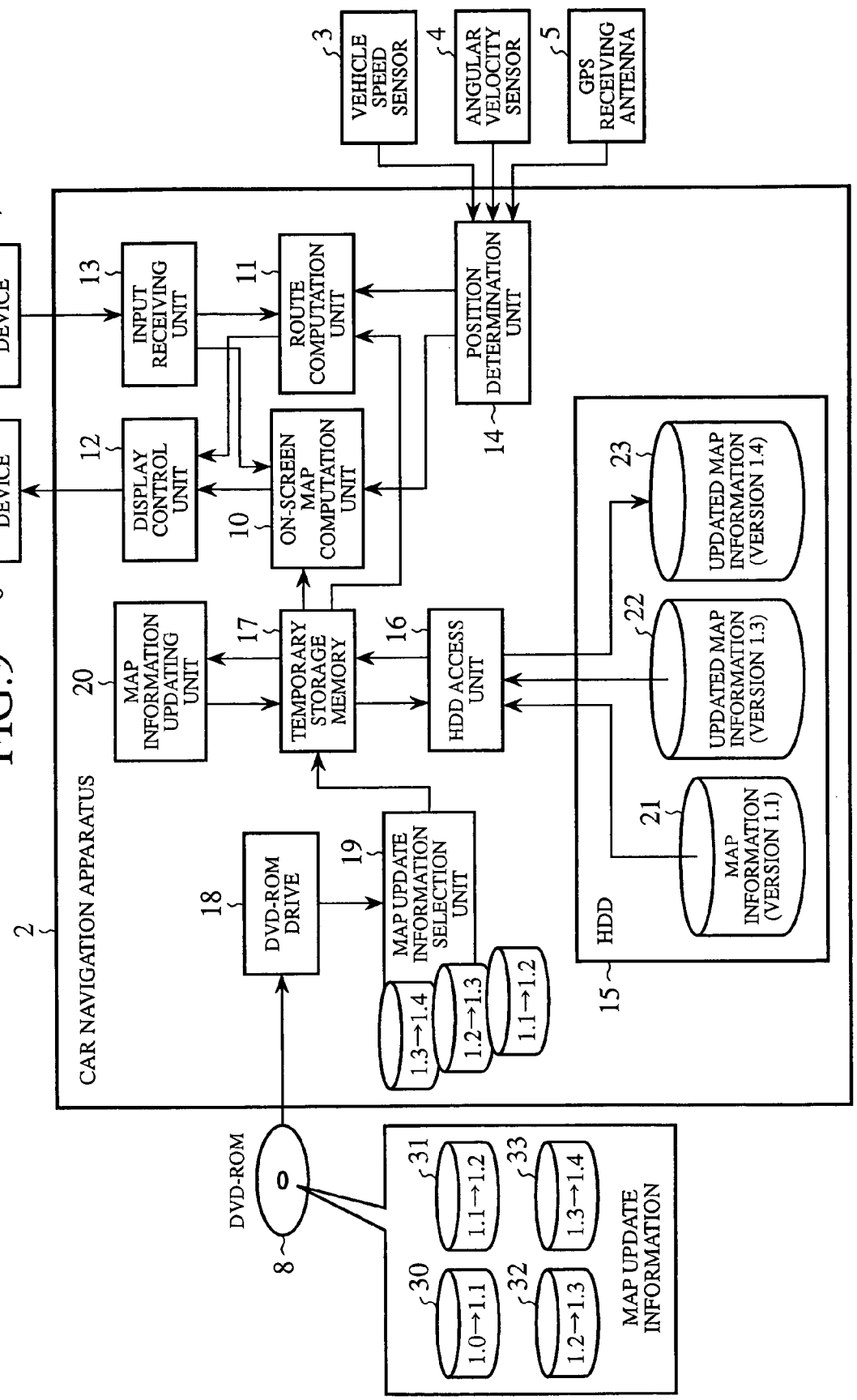

MAP UPDATE INFORMATION FILE

MAP UPDATE INFORMATION FILE

NAVIGATION APPARATUS

BACKGROUND OF THE INVENTION

1. Field of the Invention

The present invention relates to a map information processing apparatus, a map update information storage medium, a map update information data structure, a map update information creating system, and a map information updating system.

2. Description of Related Art

A prior art system, such as a navigation apparatus, that provides the user with map information for the user's convenience is known. Such a prior art system needs to revise map information at fixed intervals according to changes in roads with respect to time, and always needs to provide the user with the latest map information. To this end, there has been provided an apparatus for updating map information based on difference information about road maps (see patent reference 1, for example).

This prior art apparatus for updating map information based on difference information about road maps receives difference map information containing update data from a map transmitting means, such as a map data supply server, and stores the difference map information as received map information. The prior art apparatus then compares the received map information with previous map information, and determines which portion of the previous map information is to be updated and then extracts the determined portion as inherent difference map information. The prior art apparatus creates and outputs new map information by applying the inherent difference map information to the previous map information. Thus, since the prior art apparatus for updating map information based on difference information about road maps, which is the receiving side, can flexibly select data which should be applied to the previous map information, the map transmitting means, which is the transmitting side, need not grasp the update condition of the terminal equipment correctly. Since the prior art apparatus does not have to carry out fine control of the version of the difference map information, the structure of the prior art apparatus can be simplified.

[Patent Reference 1] Japanese Patent Application Publication (TOKKAI) No. 2002-296042

The technique disclosed by above-mentioned patent reference 1 has the following problems when further upgrading the map information which has been upgraded once according to changes in the map information which have occurred after the previous upgrading. In accordance with the prior art technique, the map transmitting means transmits changes in the map information which have occurred until now after a past time to the prior art apparatus for updating map information based on difference information about road maps at once. The prior art apparatus then compares all the received changes in the map information with map information being held thereby so as to extract a difference between all the received changes and the currently-held map information from all the received changes, and then combines the extracted information and the currently-held map information so as to update the currently-held map information.

When updating the currently-held map information, the prior art apparatus for updating map information based on difference information about road maps performs comparison between all the received changes in the map information and the map information being held thereby for each of components, such as roads and buildings. When performing comparison for each component included in the received change information, the prior art apparatus determines whether the component in question is the same as one of all components of the currently-held map information based on the lasting attributes of all the components of the currently-held map information. The lasting attributes of each component include a road shape, a road name, a route number, a VICS (Vehicle Information and Communication System) link number, names of intersecting roads, intersection names, etc.

However, there is no guarantee that these attributes are lasting, and therefore it can be predicted that the comparison between all the received changes in the map information and the map information being held by the prior art apparatus becomes difficult. A further problem is that it takes much time for the prior art apparatus to perform the comparison between all the received changes in the map information and the map information being held thereby.

SUMMARY OF THE INVENTION

The present invention is made in order to solve the above-mentioned problems, and it is therefore an object of the present invention to provide a map information processing apparatus, a map update information storage medium, a map update information data structure, a map update information creating system, and a map information updating system which can revise map information surely and quickly.

In accordance with an aspect of the present invention, there is provided a map information processing apparatus including: a map information storage unit for storing map information; a map update information storage unit for storing one or more pieces of map update information which were created when updating processes were continuously performed and which are used for updating yet-to-be-updated map information; a map update information selection unit for selecting one or more pieces of map update information required to update the map information stored in the map information storage unit from the one or more pieces of map update information stored in the map update information storage unit; and a map information updating unit for updating the map information stored in the map information storage unit by applying the one or more pieces of map update information selected by the map update information selection unit to the map information stored in the map information storage unit one by one in order in which the one or more selected pieces of map update information were created for updating of map information. Thus, every time when a current version of map information is revised, map update information is created. The map information processing apparatus then updates map information stored in the map information storage unit thereof by applying one or more pieces of map update information selected by the map update information selection unit thereof to the map information one by one in order in which the one or more selected pieces of map update information were created for updating of map information. Therefore, the map information processing apparatus can update the map information stored in the map information storage unit surely and quickly.

In accordance with another aspect of the present invention, there is provided a map update information data structure in which a variation between two different versions of map information is defined by one or more pieces of map update information each of which is created for updating yet-to-be-updated map information every time when revision is carried out between times of creation of the two different versions of map information. Thus, every time when a current version of map information is revised, map update information is created. One or more pieces of map update information thus created are stored in a storage medium having the map update information data structure. Using this storage medium, the map information processing apparatus updates map information stored in the map information storage unit thereof by applying one or more pieces of map update information selected by the map update information selection unit thereof to the map information one by one in order in which the one or more selected pieces of map update information were created for updating of map information. Therefore, the map information processing apparatus can update the map information stored in the map information storage unit surely and quickly.

In accordance with a further aspect of the present invention, there is provided a map update information storage medium for storing one or more pieces of map update information each of which is created for updating yet-to-be-updated map information every time when revision is carried out between times of creation of the two different versions of map information, the one or more pieces of map update information defining a variation between two different versions of map information. Thus, every time when a current version of map information is revised, map update information is created. One or more pieces of map update information thus created are stored in the map update information storage medium. Using this storage medium, the map information processing apparatus updates map information stored in the map information storage unit thereof by applying one or more pieces of map update information selected by the map update information selection unit thereof to the map information one by one in order in which the one or more selected pieces of map update information were created for updating of map information. Therefore, the map information processing apparatus can update the map information stored in the map information storage unit surely and quickly.

In accordance with another aspect of the present invention, there is provided a map update information creating system including a map update information creating unit for, in order to define a variation between two different versions of map information, creating map update information used for updating yet-to-be-revised map information every time when revision is carried out at intervals between times of creation of the two different versions of map information. Thus, every time when a current version of map information is revised, the map update information creating system creates map update information. One or more pieces of map update information thus created are stored in the map update information storage medium. Using this storage medium, the map information processing apparatus updates map information stored in the map information storage unit thereof by applying one or more pieces of map update information selected by the map update information selection unit thereof to the map information one by one in order in which the one or more selected pieces of map update information were created for updating of map information. Therefore, the map information processing apparatus can update the map information stored in the map information storage unit surely and quickly.

In accordance with an aspect of the present invention, there is provided a map information updating system including: a map update information creating system for, in order to define a variation between two different versions of map information, creating map update information used for updating yet-to-be-revised map information every time when revision is carried out at intervals between times of creation of the two different versions of map information; a map information processing apparatus; and a map update information providing system for providing one or more pieces of map update information created by the map update information creating system to the map information processing apparatus, the map information processing apparatus including a map information storage unit for storing map information, a map update information storage unit for storing the one or more pieces of map update information provided by the map update information providing system, a map update information selection unit for selecting one or more pieces of map update information used for updating the map information stored in the map information storage unit from the one or more pieces of map update information stored in the map update information storage unit, and a map information updating unit for updating the map information stored in the map information storage unit by applying the one or more pieces of map update information selected by the map update information selection unit to the map information stored in the map information storage unit one by one in order in which the one or more selected pieces of map update information were created for updating of map information. Thus, every time when a current version of map information is revised, map update information is created. The map information updating system then updates map information stored in the map information storage unit of the map information processing apparatus by applying one or more pieces of map update information selected by the map update information selection unit of the map information processing apparatus to the map information one by one in order in which the one or more selected pieces of map update information were created for updating of map information. Therefore, the map information updating system can update the map information stored in the map information storage unit of the map information processing apparatus surely and quickly.

Further objects and advantages of the present invention will be apparent from the following description of the preferred embodiments of the invention as illustrated in the accompanying drawings.

BRIEF DESCRIPTION OF THE DRAWINGS

FIG. 1 is a block diagram showing the structure of a map information updating system in accordance with embodiment 1 of present invention;

FIG. 2 is a flow chart (first portion) for explaining the operation of a car navigation apparatus which constitutes the map information updating system in accordance with embodiment 1 of the present invention;

FIG. 3 is a flow chart (second portion) for explaining the operation of a car navigation apparatus which constitutes the map information updating system in accordance with embodiment 1 of the present invention;

FIGS. 4A to 4C are diagrams each showing a road network representing a map used by a map information updating system in accordance with embodiment 2 of the present invention;

FIGS. 5A to 5E are diagrams showing data formats that define road networks as shown in FIGS. 4A to 4C, and a data format that defines map update information;

FIGS. 6A and 6B are diagrams each showing a road network representing a map used by a map information updating system in accordance with embodiment 3 of the present invention;

FIGS. 7A to 7C are diagrams showing data formats that define road networks as shown in FIGS. 6A and 6B, and a data format that defines map update information;

FIG. 8 is a diagram schematically showing a process of updating map information which is performed by a car navigation apparatus which constitutes a map information updating system in accordance with embodiment 4 of the present invention;

FIG. 9 is a block diagram showing the structure of a map information updating system in accordance with embodiment 5 of the present invention;

DETAILED DESCRIPTION OF THE PREFERRED EMBODIMENTS

Figure 10:
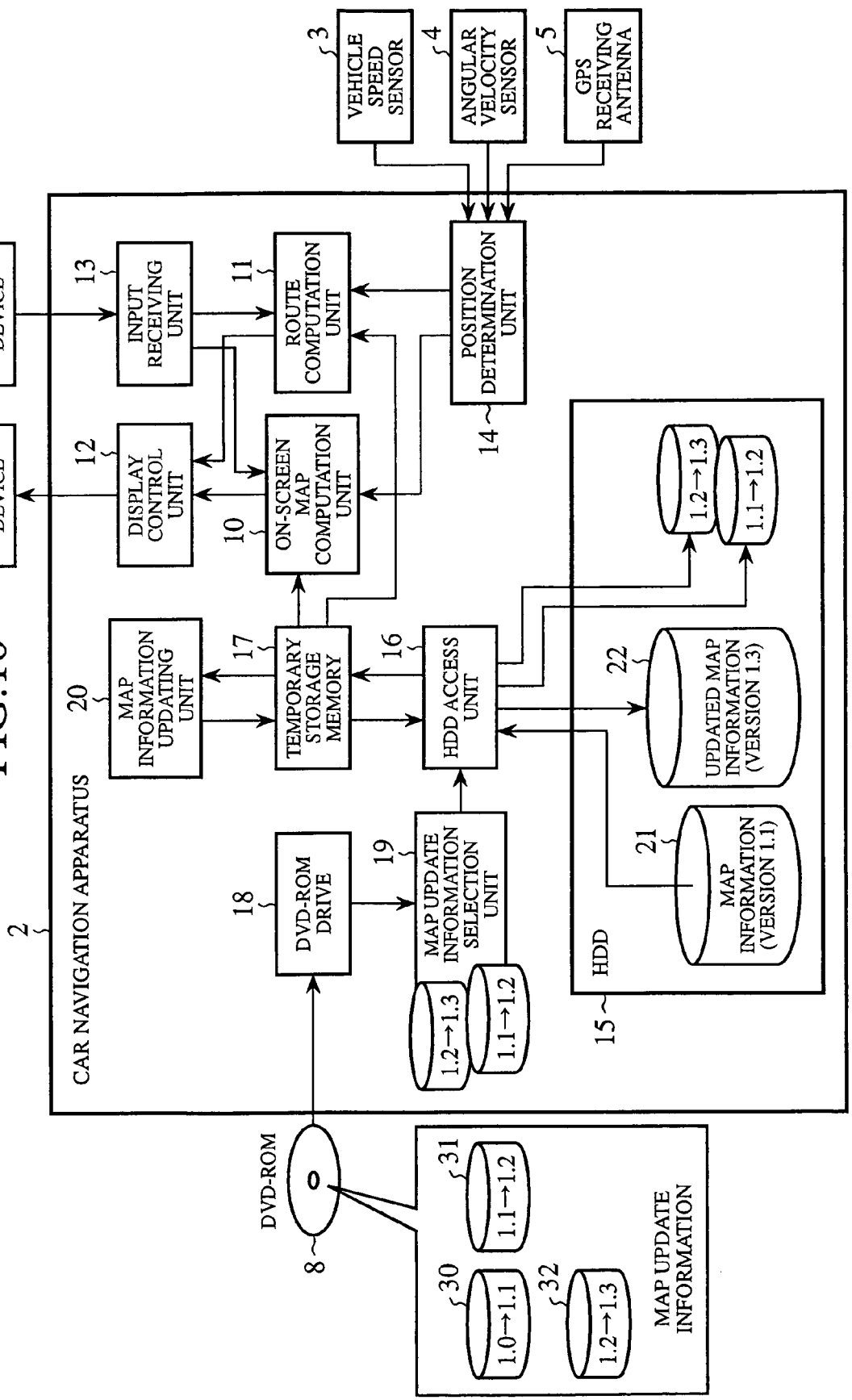
FIG. 10 is a block diagram showing the structure of a map information updating system in accordance with embodiment 6 of the present invention.

The preferred embodiment of the invention will now be described with reference to the accompanying drawings.

Embodiment 1

FIG. 1 is a block diagram showing the structure of a map information updating system in accordance with embodiment 1 of the present invention. This map information updating system is roughly divided into a map update information creating system 1 and a car navigation apparatus 2. The car navigation apparatus 2 is equivalent to a map information processing apparatus in accordance with the present invention. In FIG. 1, each arrow that connects between two components of the map information updating system indicates a data flow, and the flows of control signals are not illustrated.

The map update information creating system 1 can be constructed of a computer system, for example. Every time when the map information is revised, the map update information creating system 1 creates map update information used for updating yet-to-be-revised map information and records the map update information in a DVD-ROM 8. The details of this map update information creating system 1 will be explained below.

A vehicle speed sensor 3, an angular velocity sensor 4, a GPS receiving antenna 5, a display device 6, and an input device 7 are connected to the car navigation apparatus 2.

The vehicle speed sensor 3 detects the speed of a vehicle in which the car navigation apparatus 2 concerned is mounted, and then sends speed information indicating the speed of the vehicle to the car navigation apparatus 2. The angular velocity sensor 4 detects the direction in which the vehicle, in which the car navigation apparatus 2 concerned is mounted, is traveling, and sends direction information indicating the direction to the car navigation apparatus 2. The GPS receiving antenna 5 receives position information from GPS satellites, and sends it to the car navigation apparatus 2. The vehicle speed sensor 3, the angular velocity sensor 4, and the GPS receiving antenna 5 are used in order to detect the current position of the vehicle.

The display device 6 is constructed of an LCD, for example, and displays information received from the car navigation apparatus 2. A map and various messages can be displayed on the display device 6. The input device 7 is used in order for the user to provide various instructions to the car navigation apparatus 2. For example, the user uses the input device 7 in order to input a desired map area to be displayed on the display device 6, and a start point and an endpoint when the user desires to cause the car navigation apparatus 2 to determine an optimal route between the start point and the end point.

The DVD-ROM 8 can be inserted and detached into and from the car navigation apparatus 2. The DVD-ROM 8 corresponds to a map update information storage medium and a map update information storage means in accordance with the present invention. One or more pieces of map update information can be stored in this DVD-ROM 8. Every time when the map information is revised, map update information is created and is comprised of a variation between the yet-to-be-revised map information and the revised map information (which will be mentioned later in detail). In the example shown in FIG. 1, three pieces of map update information: map update information 30 used for updating the map information from version 1.0 to 1.1, map update information 31 used for updating the map information from version 1.1 to 1.2, and map update information 32 used for updating the map information from version 1.2 to 1.3 are stored in the DVD-ROM 8.

The car navigation apparatus 2 is provided with an on-screen map computation unit 10, a route computation unit 11, a display control unit 12, an input receiving unit 13, a position determination unit 14, a hard disk (HDD) 15, a hard disk (HDD) access unit 16, a temporary storage memory 17, a DVD-ROM drive 18, a map update information selection unit 19, and a map information updating unit 20. The on-screen map computation unit 10, the route computation unit 11, the display control unit 12, the input receiving unit 13, the position determination unit 14, the hard disk access unit 16, the map update information selection unit 19, and the map information updating unit 20 are implemented by processes performed by a microcomputer not shown in FIG. 1.

The on-screen map computation unit 10 carries out computations for displaying a map image on the display device 6 based on the map information (e.g., the one of version 1.1) which the on-screen map computation unit 10 retrieves from the hard disk 15 by way of the hard disk access unit 16. The displayed map area is specified by the current position information determined by the position determination unit 14, and is specified by the user's input information about the desired map area which is received by the input receiving unit 13. Computation results acquired by the on-screen map computation unit 10 are sent to the display control unit 12.

The route computation unit 11 determines an optimal route from the current position or the indicating start position to the indicated destination based on the map information (e.g., the one of version 1.1) which the route computation unit 11 retrieves from the hard disk 15 by way of the hard disk access unit 16, the current position information which the route computation unit 11 also retrieves from the position determination unit 14, and information indicating the start point and the end point of the route which the route computation unit 11 also retrieves from the input device 7 by way of the input receiving unit 13. Information indicating the optimal route determined by the route computation unit 11 is then sent to the display control unit 12.

The display control unit 12 creates either an image signal for displaying a map image which is based on the computation results sent from the on-screen map computation unit 10 or an image signal for displaying the optimal route which is based on the information indicating the optimal route sent from the route computation unit 11 on an on-screen map, and then sends the image signal to the display device 6.

The input receiving unit 13 sends the information indicating the on-screen map area inputted from the input device 7 to the on-screen map computation unit 10, as mentioned above, and also sends the information indicating the start point and the end point of the route which are inputted from the input device 7 to the route computation unit 11.

The position determination unit 14 detects the current position of the vehicle in which the car navigation apparatus 2 concerned is mounted based on the speed information from the vehicle speed sensor 3, the direction information from the angular velocity sensor 4, and the position information from the GPS receiving antenna 5. The current position information indicating the current position of the vehicle detected by the position determination unit 14 is then sent to both the on-screen map computation unit 10 and the route computation unit 11, as mentioned above.

The hard disk 15 corresponds to a map information storage unit and an updated map information storage unit in accordance with the present invention. The updated map information (e.g., the one of version 1.3 in the illustrated example) created by map information revision (or upgrading), as well as the map information (e.g., the one of version 1.1 in the illustrated example) which had been pre-installed at the time of purchase, are stored in the hard disk 15. The details of this revising processing will be mentioned later.

The hard disk access unit 16 reads the map information 21 from the hard disk 15, and performs a control process of writing the updated map information 22 in the hard disk 15. Concretely, the hard disk access unit 16 sends the map information 21 which it reads from the hard disk 15 to the temporary storage memory 17, and also writes the updated map information 22 which is created on the temporary storage memory 17 in the hard disk 15.

The temporary storage memory 17 is used as a work memory when the map information updating unit 20 updates the map information stored in the hard disk 15 according to one or more pieces of map update information selected and retrieved by the map update information selection unit 19. Therefore, this temporary storage memory 17 can be accessed by the hard disk access unit 16, the map update information selection unit 19, and the map information updating unit 20. The temporary storage memory 17 is also used as a work memory when the on-screen map computation unit 10 and the route computation unit 11 work.

The DVD-ROM drive 18 reads one or more pieces of map update information stored in the inserted DVD-ROM 8, and sends it to the map update information selection unit 19.

The map update information selection unit 19 selects and retrieves a piece of map update information required for updating the map information 21 stored in the hard disk 15 from among the one or more pieces of map update information read from the DVD-ROM 8 inserted into the DVD-ROM drive 18, and sends the retrieved piece of map update information to the temporary storage memory 17. In the example shown in FIG. 1, since the map information 21 stored in the hard disk 15 is the one of version 1.1, the map update information selection unit 19 selects and retrieves both the map update information 31 used for updating the map information from version 1.1 to 1.2 and the map update information 32 used for updating the map information from version 1.2 to 1.3, and sends them to the temporary storage memory 17.

The map information updating unit 20 performs a process of updating the map information 21 which is read from the hard disk 15 by way of the hard disk access unit 16 and is temporarily stored into the temporary storage memory 17 according to the map update information which is selected and retrieved by the map update information selection unit 19 and is temporarily stored into the primary storage memory 17. The map information on which the updating process is performed on the temporary storage memory 17 is sent to the on-screen map computation unit 10 and the route computation unit 11. The updated map information is also saved in the hard disk 15 by way of the hard disk access unit 16, as updated map information 22.

Next, the operation of the car navigation apparatus which has the structure as mentioned above and which constitutes the map information updating system in accordance with embodiment 1 of the present invention will be explained with reference to a flow chart shown in FIGS. 2 and 3.

Hereafter, it is assumed that the map information updating system performs an updating process on the map information 21 of version 1.1 stored in the hard disk 15 of the car navigation apparatus 2 by using the DVD-ROM 8 in which the map update information 30 used for updating the map information from version 1.0 to 1.1, the map update information 31 used for updating the map information from version 1.1 to 1.2, and the map update information 32 used for updating the map information from version 1.2 to 1.3 are recorded.

Initially, the car navigation apparatus 2 is placed in a state in which it is waiting for a request for retrieval of map information (in step ST10), and checks to see whether either the on-screen map computation unit 10 or the route computation unit 11 has made a request for retrieval of map information (in step ST11). When determining that no request for retrieval of map information has been made, the car navigation apparatus 2 returns to step ST10 in which it is placed in the request waiting state in which it is waiting for a request for retrieval of map information again.

When, in step ST11, determining that a request for retrieval of map information has been made while repeating those steps ST10 and ST11, the car navigation apparatus 2 reads map information corresponding to the request (in step ST12). In other words, the hard disk access unit 16 reads map information about a map area, which is specified by the request for retrieval of map information, from the map information 21 of version 1.1 stored in the hard disk 15.

The map information read in step ST12 is then stored in the temporary storage memory 17 (in step ST13). The version of the map information is then determined (in step ST14). In this case, the map update information selection unit 19 determines the version of the map information stored in the temporary storage memory 17 as "1.1".

The map update information selection unit 19 then performs a process of selecting one or more pieces of map update information (in steps ST15 to ST19). In this map update information selection processing, the map update information selection unit 19 checks to see whether there is any yet-to-be-checked map update information (in step ST15). Concretely, the map update information selection unit 19 reads a piece of map update information stored in the DVD-ROM 8, and then checks to see whether or not it is yet to be checked, that is, whether processes of steps ST16 and later have been performed on the read piece of map update information. Therefore, the map update information selection unit 19 initially determines that all pieces of map update information stored in the DVD-ROM 8 are yet to be checked.

When, in step ST15, determining that there is one or more pieces of yet-to-be-checked map update information, the map update information selection unit 19 selects and retrieves one of the one or more pieces of yet-to-be-checked map update information (in step ST16). The map update information selection unit 19 then checks to see whether or not the version of target map information to which the selected map update information is to be applied to update the target map information is earlier than the version of the map information 21 to be updated (in step ST17). When then determining that the version of target map information to which the selected map update information is to be applied is earlier than the version of the map information 21 to be updated, the map update information selection unit 19 returns to step ST15 because there is no necessity to update the map information 21 by using the selected map update information.

On the other hand, when, in step ST17, determining that the version of target map information to which the selected map update information is to be applied is not earlier than the version of the map information 21 to be updated, the map update information selection unit 19 checks to see whether the map update information selected in step ST16 includes map update information about the requested map area specified by the map information retrieval request (in step ST18). When determining that the selected map update information includes no map update information about the requested map area, the map update information selection unit 19 returns to step ST15 in which it repeatedly performs the above-mentioned processing.

On the other hand, when, in step ST18, determining that the selected map update information includes map update information about the requested map area specified by the map information retrieval request, the map update information selection unit 19 stores the map update information about the requested map area in the temporary storage memory 17 (in step ST19). After that, the map update information selection unit 19 returns to step ST15 in which it repeatedly performs the above-mentioned processing. When, in step ST15, determining that there is no more yet-to-be-checked map update information, the map update information selection unit 19 selects and retrieves both the map update information 31 used for updating the map information from version 1.1 to 1.2 and the map update information 32 used for updating the map information from version 1.2 to 1.3, and then stores them in the temporary storage memory 17.

After, in step ST15, determining that there is no more yet-to-be-checked map update information, the map information updating unit 20 checks to see whether any yet-to-be-applied map update information is stored in the temporary storage memory 17 (in step ST20). When determining that one or more pieces of yet-to-be-applied map update information are stored in the temporary storage memory 17, the map information updating unit 20 selects the map update information that can be applied to the earliest version of target map information from the one or more pieces of yet-to-be-applied map update information (in step ST21). The map information updating unit 20 then updates the map information 21 by using the selected map update information (in step ST22). After that, the map information updating unit 20 returns to step ST20 in which it repeatedly performs the above-mentioned processing. In the example shown in FIG. 1, by repeatedly performing the above-mentioned steps ST20 to ST22, the map information updating unit 20 applies the map update information 31 used for updating the map information from version 1.1 to 1.2 to the map information 21, and, after that, applies the map update information 32 used for updating the map information from version 1.2 to 1.3 to the updated map information to which the map update information 31 has been applied so as to create updated map information 22 of version 1.3.

When, in step ST20, determining that no more yet-to-be-applied map update information is stored in the temporary storage memory 17, the map information updating unit 20 checks to see whether map update information has been applied to the map information 21 at least once (in step ST23). When determining that map update information has been applied to the map information 21 at least once, the car navigation apparatus stores the updated map information 22 in the hard disk 15 (in step ST24). In other words, the hard disk access unit 16 reads the updated map information 22 from the temporary storage memory 17, and then stores it in the hard disk 15. After that, the updated map information 22 is sent to the source of the request for retrieval of map information (in step ST25). In other words, the car navigation apparatus reads the updated map information 22 from the temporary storage memory 17, and then sends it to either the on-screen map computation unit 10 or the route computation unit 11.

In contrast, when, in step ST23, determining that no map update information has been applied to the map information 21, the car navigation apparatus sends the map information 21 stored in the temporary storage memory 17 to the source of the request for retrieval of map information (in step ST26). In other words, the car navigation apparatus sends the map information 21 stored in the temporary storage memory 17 to either the on-screen map computation unit 10 or the route computation unit 11.

As previously explained, the map information updating system in accordance with this embodiment 1 can apply one or more pieces of map update information which were created every time when map information was revised and which are pre-recorded in one DVD-ROM to the car navigation apparatus. Therefore, the map information updating system can easily carry out management of the version of the map information stored therein. The map information updating system can also revise the map information surely and quickly.

In accordance with this embodiment, one or more pieces of map update information are pre-stored in the DVD-ROM and are applied to the car navigation apparatus as needed. Instead of the DVD-ROM, a storage media, such as a small hard disk or a memory card, can be used to store the one or more pieces of map update information which can be applied to the car navigation apparatus. As an alternative, the car navigation apparatus can acquire the one or more pieces of map update information via broadcasting or via a communication link.

In accordance with this embodiment, the map information and the updated map information are stored in the same hard disk, as previously mentioned. As an alternative, they can be stored in different storage media, respectively. In addition, the map information can be stored in a storage media, such as a DVD-ROM, rather than the hard disk.

Embodiment 2

A map information updating system in accordance with embodiment 2 of the present invention is so constructed as to update map information by inserting map update information into the map information. The map information updating system in accordance with this embodiment 2 has the same structure as that of above-mentioned embodiment 1. Hereafter, a method of updating map information which a map information updating unit 20 of the map information updating system employs will be explained mainly, by taking a case where the map information is updated from version 1.1, via version 1.2, to version 1.3 as an example.

FIGS. 4A to 4C are diagrams each showing a road network which represents a map. FIG. 4A shows a map of version 1.1, FIG. 4B shows a map of version 1.2, and FIG. 4C shows a map of version 1.3. In FIGS. 4A to 4C, each mark O represents a node showing an intersection or the like, each line segment between two nodes represents a link showing a road between two nodes, and Ni (i=0, 1, 2, . . . ) represents a node number. FIGS. 4A to 4C show that a node N5 and a link which connects this node N5 and a node N3 are added when the map information is revised from version 1.1 to version 1.2, and a link which connects the node N5 and a node N4 is added and a link which connects a node N0 and a node N1 is deleted when the map information is revised from version 1.2 to version 1.3.

Figure 5:
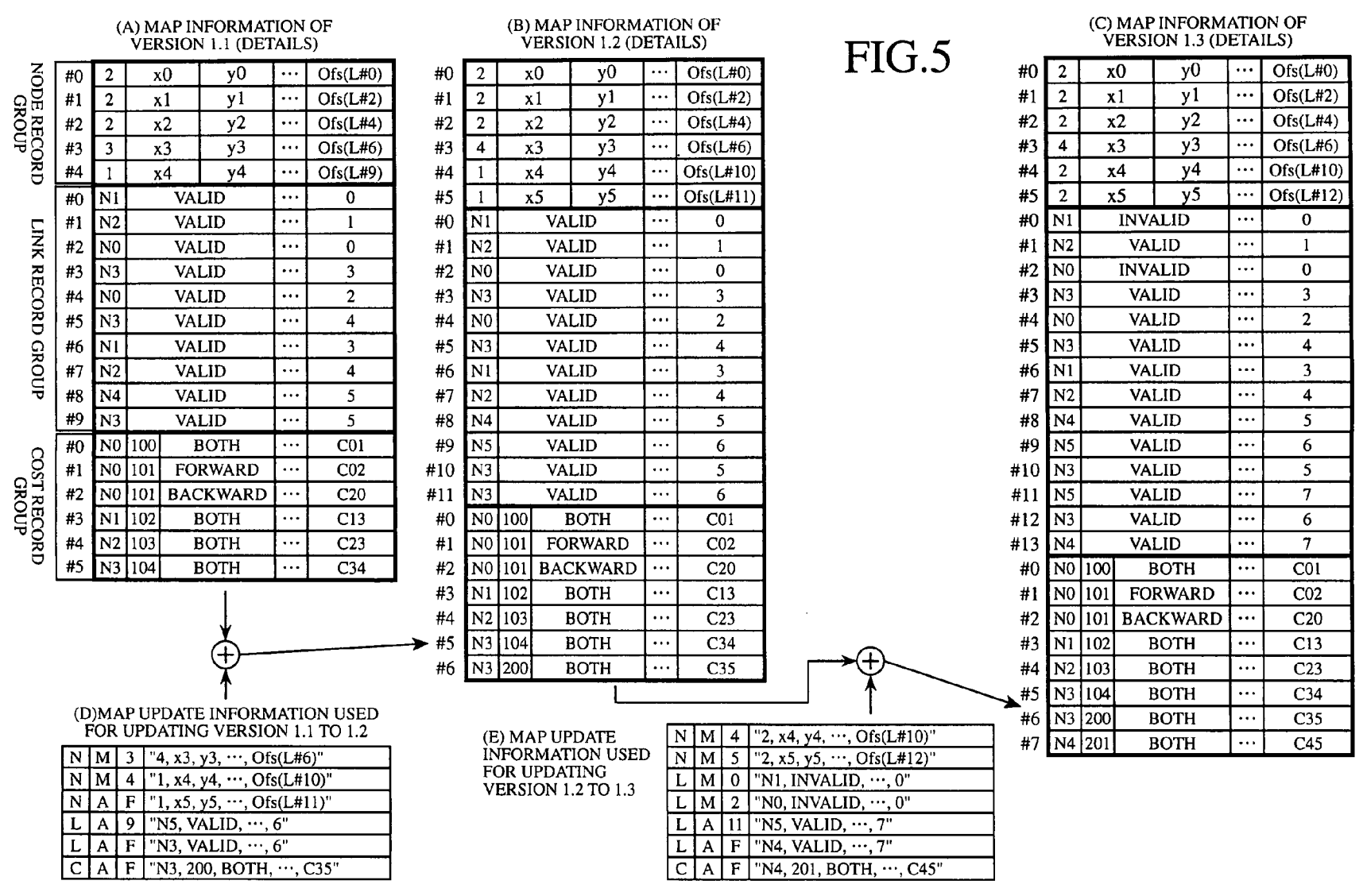

As shown in FIGS. 5A to 5C, each of the road networks shown in FIGS. 4A to 4C can be represented by a node record group which is a set of node records each representing a node, a link record group which is a set of link records each representing a link, and a cost record group which is a set of cost records each representing a cost at which vehicles travel a corresponding link. Marks shown in FIGS. 5A to 5C have the following meanings. xi and yi are the XY coordinates (xi, yi) of a node Ni, L#i is the i-th link record included in the link record group, Ofs(a) is an offset to a, and Cij is an average travel cost of a link from a node Ni to another node Nj (in case of Cij=Cji, these nodes share the cost record).

Each node record which constitutes the node record group includes "the number of links connected to a corresponding node, the x-coordinate of the node, the y coordinate of the node . . . , and an offset to a link record corresponding to the node". Each link record which constitutes the link record group includes "the node number of a connection partner node about corresponding link, a link invalid flag . . . , and a cost record number corresponding to the link".

Each cost record which constitutes the cost record group includes "a node number, a link ID, a link direction . . . , and an average travel cost". The node number is the number of a start node of a link corresponding to each cost record, and the average travel cost is the cost required for vehicles to travel between both ends of the link corresponding to each cost record and is computed based on the length of a corresponding road, the width of the corresponding road, the number of traffic signals arranged between the both ends of the link, i.e., the corresponding road, and so on. The link direction is the direction of the average travel cost of the link corresponding to each cost record. "Forward direction" shows that the travel cost is the one defined in a direction from the start point to the end point of the corresponding link, "backward direction" shows that the travel cost is the one defined in a direction from the end point to the start point of the corresponding link, and "both" shows that the travel cost required for vehicles to travel from the start point to the end point of the link are equal to that required for vehicles to travel from the end point to the start point of the link.

FIGS. 5D and 5E show two pieces of map update information respectively used for updating the two pieces of map information as shown in FIGS. 5A and 5B. Each of the two pieces of map update information has the following data representation format: the first column showing a type of data to be updated or added (N shows that the node record group is to be updated, L shows that the link record group is to be updated, and C shows that the cost record group is to be updated), the second column showing a type of updating (M shows updating of data, A shows addition of data, and D shows deletion of data), the third column showing an update record number indicating the location of the data to be updated or a location where the data is to be added (e.g., a location where the data is to be added when the second column is "A", or "F" indicating the end of the record group in question when the data is to be added to the end of the record group in question), and the fourth column showing the contents of the data which is to be added or rewritten to the location defined by the third column.

By using the map update information, as shown in the FIG. 5D, used for updating the map information from version 1.1 to version 1.2, the map information updating unit 20 replaces the data of the node record #3 with the data at the fourth column of the first line of the map update information, replaces the data of the node record #4 with the data at the fourth column of the second line of the map update information, adds the data (record) at the fourth column of the third line of the map update information to the end of the node record group, adds the data (record) at the fourth column of the fourth line of the map update information to a location before the link record #9, adds the data (record) at the fourth column of the fifth line of the map update information to the end of the link record group, and adds the data (record) at the fourth column of the sixth line of the map update information to the end of the cost record group. As a result, the map information is updated from version 1.1 to version 1.2.

According to the above-mentioned method of updating map information, which the map information updating system employs, the map information of either of version 1.2 and version 1.3 can have the same data representation format as the map information of version 1.1.

Embodiment 3

A map information updating system in accordance with embodiment 3 of the present invention is so constructed as to, in response to a request for retrieval of map information, update the map information as needed by adding a part of map update information to the end of the map information as an update record group, storing another part of the map update information, as a reference table, in a temporary storage memory, and by sending the map information, to which the update record group is added, and the reference table back to the source of the request.

The map information updating system in accordance with this embodiment 3 has the same structure as that of above-mentioned embodiment 1. Hereafter, a method of updating map information which a map information updating unit 20 of the map information updating system employs will be explained mainly, by taking a case where the map information is updated from version 1.1 to version 1.3 as an example.

FIGS. 6A and 6B are diagrams each showing a road network that represents a map. FIG. 6A shows a map of version 1.1, and FIG. 6B shows a map of version 1.2. In FIGS. 6A and 6B, each mark O represents a node showing an intersection or the like, each line segment between two nodes represents a link showing a road between two nodes, and Ni (i=0, 1, 2, . . . ) represents a node number. FIGS. 6A and 6B show that a node N5 and a link which connects this node N5 and a node N3 are added when the map information is revised from version 1.1 to version 1.2.

As shown in FIGS. 7A and 7B, each of the road networks shown in FIGS. 6A and 6B can be represented by a node record group which is a set of node records each representing a node, a link record group which is a set of link records each representing a link, and a cost record group which is a set of cost records each representing a cost at which vehicles travel a corresponding link. Marks shown in FIGS. 7A to 7C have the same meanings as those used in above-mentioned embodiment 2 (refer to FIGS. 5A to 5C).

In accordance with this embodiment 3, the map update information is constructed of the update record group and the reference table. As shown in FIG. 7B, the update record group includes a node record group, a link record group, and a cost record group which are targets to be updated, and is added to the end of the map information (version 1.2) that is the target to be updated.

The reference table includes records each of which includes a type of data to be updated or added, a type of updating, a target record number indicating the location of the data to be updated or a location where the data is to be added, and an update record number indicating a record containing the contents of the data, each of the records corresponding to one record of the update record group, as shown in FIG. 7C. This reference table corresponds to elements at the first through third columns of the map update information in accordance with embodiment 2 shown in the FIG. 5D, and the update record group corresponds to the contents of the data at the fourth column of the map update information in accordance with embodiment 2 shown in the FIG. 5D.

In a car navigation apparatus 2 that can handle map update information having the above-mentioned structure, when a piece of map update information selected and retrieved by a map update information selection unit 19 is stored in a temporary storage memory 17, a map information updating unit 20 adds data at the fourth column of the selected map update information, as an update record group, to the end of the map information of version 1.2 which is the target to be updated, as shown in FIG. 7B. The map information updating unit 20 then creates a reference table based on data at the first through third columns of the selected map update information, and stores the reference table in the temporary storage memory 17.

When receiving a request for retrieval of map information from either an on-screen map computation unit 10 or a route computation unit 11, the car navigation apparatus 2 sends the map information to which the update record group shown in FIG. 7B is added and the reference table shown in FIG. 7C, which are stored in the temporary storage memory 17, as updated map information, to either the on-screen map computation unit 10 or the route computation unit 11.

The on-screen map computation unit 10 or the route computation unit 11 interprets the map information sent thereto while referring to the reference table. For example, based on the update record number #3 of the reference table, the on-screen map computation unit 10 or the route computation unit 11 adds the update record #3 of the update record group to the end of the link record #9.

As previously explained, the map information updating system in accordance with embodiment 3 of the present invention need not process existing map information based on map update information, and only has to divide the map update information into an update record group and a reference table, adds the update record group to the end of the existing map information, and stores the map information to which the update record group is added and the reference table in the temporary storage memory 17. Therefore, the processing performed by the map information updating unit 20 can be simplified.

Embodiment 4

In a map information updating system in accordance with embodiment 4 of the present invention, map update information includes both difference information, which contains variations in map information, and replacement information, which is map information of the latest version. The map information updating system in accordance with this embodiment 4 has the same structure as that of above-mentioned embodiment 1. A method of updating map information will be explained mainly.

FIG. 8 is a diagram schematically showing the process of updating map information. In this example, in a car navigation apparatus 2 in which map information of version 1.1 is pre-installed in a hard disk 15, the map information is updated to version 1.3.

The map information of version 1.1 stored in the hard disk 15 includes data A, B, C, and D. Map update information which is stored in a DVD-ROM 8 and is provided for the car navigation apparatus 2 is used for updating the map information of version 1.1 or later to version 1.3, and includes map update information 30 which is difference information used for updating data A and B of the map information of version 1.0 to version 1.1, map update information 31 which is difference information used for updating data A and B of the map information of version 1.1 to version 1.2, map update information 32 which is difference information used for updating data A and B of the map information of version 1.2 to version 1.3, and replacement information which is data C of version 1.3 and replacement information which is data D of version 1.3. Each replacement information includes information which is not appropriate to be updated using difference information (e.g., color information, voice recognition information, etc.).

When the DVD-ROM 8 is inserted into a DVD-ROM drive 18 of the car navigation apparatus 2, a map update information selection unit 19 selects and retrieves all the pieces of replacement information from the map update information stored in the DVD-ROM 8, and sends them to a temporary storage memory 17 (in step S1). In the example of FIG. 8, since the two pieces of replacement information correspond to the data C and D, respectively, a map information updating unit 20 replaces the data C and D included in the map information of version 1.1 with the two pieces of replacement information of version 1.3 stored in the temporary storage memory 17, respectively.

As for the data A and B which are to be updated using difference information, by using the method explained in above-mentioned embodiments 1, 2, and 3, the map information updating unit 20 applies both the map update information 31 which is the difference information used for updating the map information of version 1.1 to the one of version 1.2 and the map update information 32 which is the difference information used for updating the map information of version 1.2 to the one of version 1.3 to the data A and B included in the map information of version 1.1 one by one so as to create the data A and B of version 1.3.

After the two pieces of map update information stored in the DVD-ROM 8 are thus applied to the map information stored in the hard disk 15, the contents of the hard disk 15 are so updated as to have the data A which is updated to version 1.3 using the difference information, the data B which is updated to version 1.3 using the difference information, the data C of version 1.3 which is one piece of replacement information, and the data D of version 1.3 which is one piece of replacement information, as shown on an upper right-hand side of FIG. 8.

Each of the data A and B which is updated using the difference information includes some data corresponding to an updated map area, while each of the data C and D which is updated using the replacement information is data about the whole of a corresponding map area. Since the data C and D are thus updated using the two pieces of replacement information, respectively, and therefore the previous data C and D of version 1.1 which are yet to be updated become unnecessary, they are deleted.

As previously explained, the map information updating system in accordance with embodiment 4 of the present invention only has to provide, as replacement information, the latest version of map information in order to update existing map information. Therefore, the map information updating system makes it possible for the car navigation apparatus 2 to perform the process of updating the map information with a higher degree of efficiency and also makes it possible to provide map update information for the car navigation apparatus 2 by using the DVD-ROM 8 with a higher degree of efficiency.

In accordance with this embodiment, the existing map information and the updated map information are stored in the same hard disk. As an alternative, the existing map information and the updated map information can be stored in different storage media, respectively.

Embodiment 5

A map information updating system in accordance with embodiment 5 of the present invention is so constructed as to be able to further update already-updated map information as needed when map information stored in a hard disk of a car navigation apparatus has been already updated and is stored as the updated map information.

The map information updating system in accordance with this embodiment 5 has the same structure as that of above-mentioned embodiment 1. FIG. 9 is a block diagram showing the structure of the map information updating system in accordance with embodiment 5 of the present invention. The map information updating system in accordance with this embodiment differs from that in accordance with above-mentioned embodiment 1 in that map update information 33 of version 1.4 is stored in a DVD-ROM 8 and updated map information of version 1.3 is already stored in the hard disk 15 of the car navigation apparatus.

Assuming that updating of map information is carried out every year, in addition to three pieces of map update information 30, 31, and 32 stored in a previous DVD-ROM that was provided one year ago when the map information was updated to version 1.3, the latest DVD-ROM 8 that is provided the year after the previous DVD-ROM was provided stores map update information 33 used for updating the map information from version 1.3 to 1.4 therein.

In response to a request for retrieval of map information from either an on-screen map computation unit 10 or a route computation unit 11, the car navigation apparatus 2 in accordance with this embodiment 5 updates the map information as follows. In other words, when map information about a requested map area is included in updated map information 22 of version 1.3 stored in the hard disk 15, a map information updating unit 20 applies the map update information 33 used for updating the map information from version 1.3 to 1.4 to the updated map information 22 of version 1.3 so as to update the map information from version 1.3 to version 1.4, and a hard disk access unit 16 stores the updated result in the hard disk 15 as updated map information 23 of version 1.4.

In contrast, when no map information about the requested map area is included in the updated map information 22 of version 1.3 stored in the hard disk 15, the map information updating unit 20 applies the map update information 31 used for updating the map information from version 1.1 to 1.2 to the updated map information 21 of version 1.1 so as to update the map information from version 1.1 to version 1.2 first, also applies the map update information 32 used for updating the map information from version 1.2 to 1.3 to the updated map information so as to update the map information from version 1.2 to version 1.3, and further applies the map update information 33 used for updating the map information from version 1.3 to 1.4 to the updated map information so as to update the map information from version 1.3 to version 1.4, and the hard disk access unit 16 stores the updated result in the hard disk 15 as the updated map information 23 of version 1.4.

As previously explained, the map information updating system in accordance with embodiment 5 of the present invention is so constructed as to, when-map information which has been already updated based on map update information in the past is stored in the hard disk 15, be able to further update the already-updated map information as needed. Therefore, the time required for updating the existing map information can be reduced.

In accordance with this embodiment, one or more pieces of map update information are pre-stored in one DVD-ROM and are applied to the car navigation apparatus as needed. Instead of one DVD-ROM, a storage media, such as a small hard disk or a memory card, can be used to store the one or more pieces of map update information which can be applied to the car navigation apparatus. As an alternative, the car navigation apparatus can acquire the one or more pieces of map update information via broadcasting or via a communication link.

In accordance with this embodiment, the map information and the updated map information are stored in the same hard disk, as previously mentioned. As an alternative, they can be stored in different storage media, respectively. In addition, the map information can be stored in a storage media, such as a DVD-ROM, rather than the hard disk.

Embodiment 6

A map information updating system in accordance with embodiment 6 of the present invention is so constructed as to carry out map updating processing after storing the contents of a DVD-ROM 8 in a hard disk 15.

The map information updating system in accordance with this embodiment 6 has the same structure as that of above-mentioned embodiment 1. FIG. 10 is a diagram showing the structure of the map information updating system in accordance with embodiment 6 of the present invention. The map information updating system in accordance with this embodiment differs from that in accordance with embodiment 1 in that when a DVD-ROM 8 is inserted in a DVD-ROM drive 18 of a car navigation apparatus 2, a map update information selection unit 19 selects and retrieves one or more required pieces of map update information from the inserted DVD-ROM 8 and stores them in the hard disk 15, and, after that, carries out map updating processing. Therefore, the map update information selection unit 19 does not store any map update information directly in a temporary storage memory 17.

Figure 11:
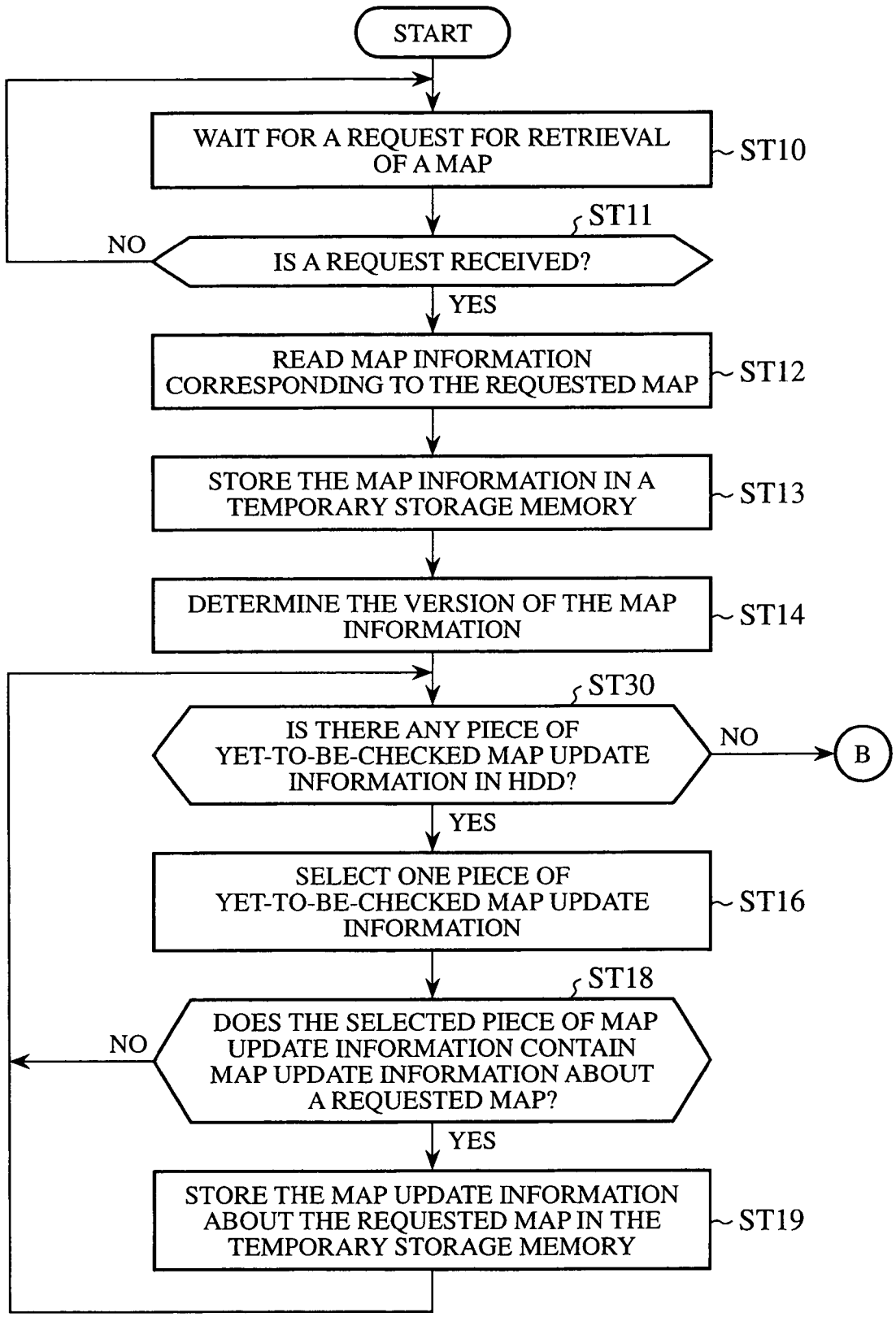
FIG. 11 is a flow chart (first portion) for explaining the operation of a car navigation apparatus which constitutes the map information updating system in accordance with embodiment 6 of the present invention.
Figure 12:
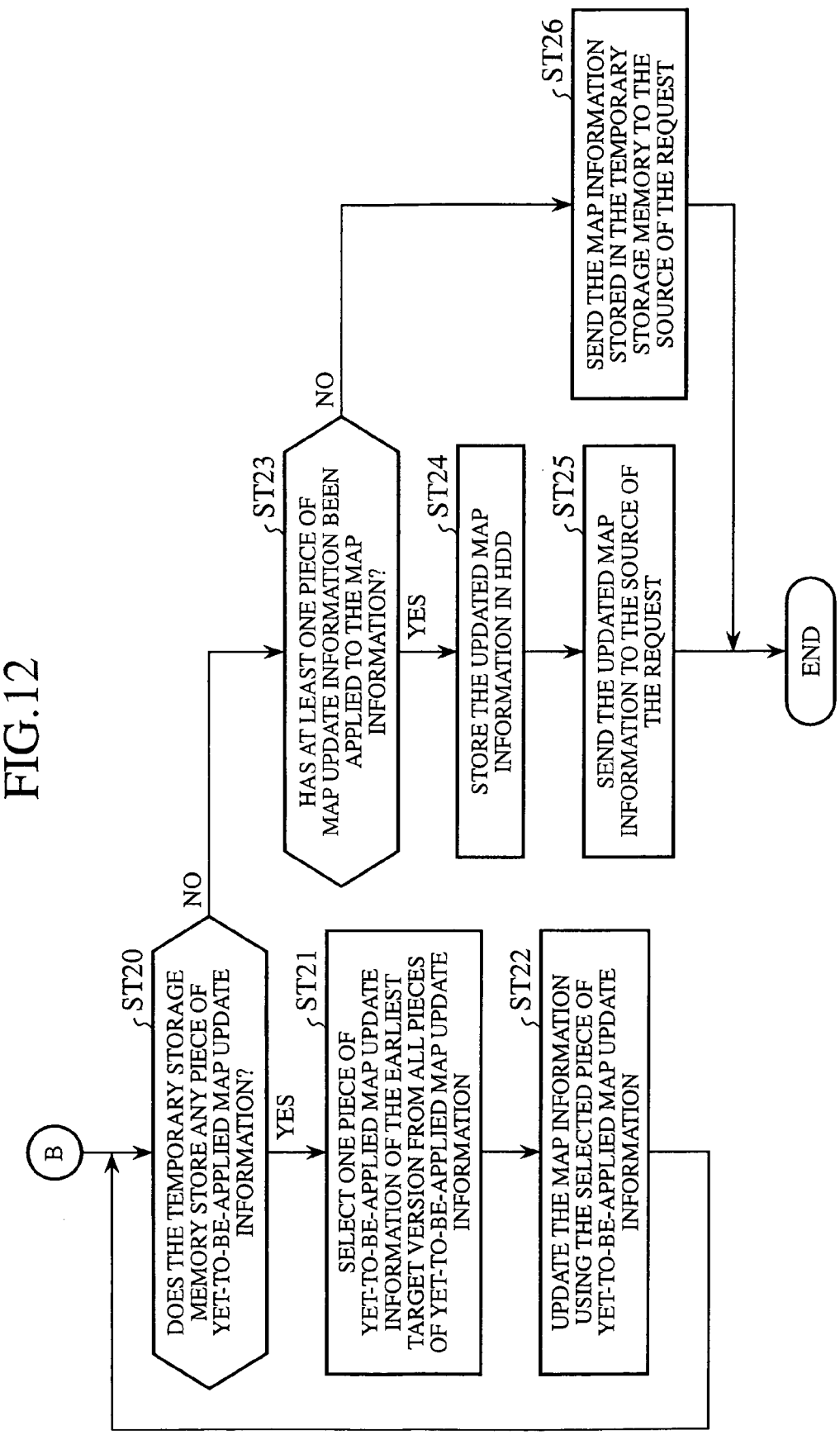
FIG. 12 is a flow chart (second portion) for explaining the operation of the car navigation apparatus which constitutes the map information updating system in accordance with embodiment 6 of the present invention.

Next, the operation of the car navigation apparatus which constitutes the map information updating system in accordance with embodiment 6 of the present invention will be explained with reference to a flow chart shown in FIGS. 11 and 12.

Hereafter, it is assumed that the map information updating system performs an updating process on the map information of version 1.1 stored in the hard disk 15 of the car navigation apparatus 2 by using the DVD-ROM 8 in which map update information 30 used for updating the map information from version 1.0 to 1.1, map update information 31 used for updating the map information from version 1.1 to 1.2, and map update information 32 used for updating the map information from version 1.2 to 1.3 are recorded.

In the car navigation apparatus 2, when the DVD-ROM 8 is inserted in a DVD-ROM drive 18, the map update information selection unit 19 determines the version of the map information stored in the hard disk 15 first, and then selects and retrieves one or more pieces of map update information which can be applied to the determined version of map information from all pieces of map update information stored in the DVD-ROM 8. In this case, the map update information selection unit 19 determines the version of the map information stored in the hard disk 15 as "1.1". The map update information selection unit 19 then selects and retrieves one or more required pieces of map update information from all pieces of map update information stored in the DVD-ROM 8 based on the determined version of map information stored in the hard disk 15. In the example of FIG. 10, the map update information selection unit 19 selects and retrieves the map update information 31 used for updating the map information from version 1.1 to 1.2 and the map update information 32 used for updating the map information from version 1.2 to 1.3. The two pieces of map update information 31 and 32 selected and retrieved by the map update information selection unit 19 are then stored, via a hard disk access unit 16, in the hard disk 15.

When the above-mentioned processing is completed, the car navigation apparatus 2 is placed in a state in which it is waiting for a request for retrieval of map information (in step ST10), and checks to see whether either an on-screen map computation unit 10 or a route computation unit 11 has made a request for retrieval of map information (in step ST11). When determining that no request for retrieval of map information has been made, the car navigation apparatus 2 returns to step ST10 in which it is placed in the request waiting state in which it is waiting for a request for retrieval of map information again.

When, in step ST11, determining that a request for retrieval of map information has been made while repeating those steps ST10 and ST11, the car navigation apparatus 2 reads map information corresponding to the request (in step ST12). In other words, the hard disk access unit 16 reads map information about a map area, which is specified by the request for retrieval of map information, from the map information 21 of version 1.1 stored in the hard disk 15.

The map information read in step ST12 is then stored in the temporary storage memory 17 (in step ST13). The version of the map information is then determined (in step ST14). In other words, the map update information selection unit 19 determines the version of the map information stored in the temporary storage memory 17. In the example of FIG. 10, the map update information selection unit 19 determines the version of the map information stored in the temporary storage memory 17 as "1.1".

The map update information selection unit 19 then performs a process of selecting one or more pieces of map update information (in steps ST30, ST16, ST18 and ST19). In this map update information selection processing, the map update information selection unit 19 checks to see whether there is any yet-to-be-checked map update information (in step ST15). Concretely, the map update information selection unit 19 reads a piece of map update information stored in the DVD-ROM 8, and then checks to see whether or not it is yet to be checked, that is, whether processes of steps ST16 and later have been performed on the read piece of map update information. Therefore, the map update information selection unit 19 initially determines that all the pieces of map update information are yet to be checked.

When, in step ST30, determining that there is one or more pieces of yet-to-be-checked map update information, the map update information selection unit 19 selects and retrieves one of the one or more pieces of yet-to-be-checked map update information (in step ST16). The map update information selection unit 19 then checks to see whether or not the selected piece of map update information includes map update information about the requested map area (in step ST18). When then determining that the selected piece of map update information includes no map update information about the requested map area, the map update information selection unit 19 returns to step ST30 in which it repeatedly performs the above-mentioned processing.

On the other hand, when, in step ST18, determining that the selected map update information includes map update information about the requested map area specified by the map information retrieval request, the map update information selection unit 19 stores the map update information about the requested map area in the temporary storage memory 17 (in step ST19). After that, the map update information selection unit 19 returns to step ST15 in which it repeatedly performs the above-mentioned processing. When, in step ST30, determining that there is no yet-to-be-checked map update information, the map update information selection unit 19 selects and retrieves both the map update information 31 used for updating the map information from version 1.1 to 1.2 and the map update information 32 used for updating the map information from version 1.2 to 1.3, and then stores them in the temporary storage memory 17.

After, in step ST30, determining that there is no more yet-to-be-checked map update information, the map information updating unit 20 checks to see whether any yet-to-be-applied map update information is stored in the temporary storage memory 17 (in step ST20). When determining that one or more pieces of yet-to-be-applied map update information are stored in the temporary storage memory 17, the map information updating unit 20 selects the map update information that can be applied to the earliest version of target map information from the one or more pieces of yet-to-be-applied map update information (in step ST21). The map information updating unit 20 then updates the map information by using the selected map update information (in step ST22). After that, the map information updating unit 20 returns to step ST20 in which it repeatedly performs the above-mentioned processing. In the example shown in FIG. 10, by repeatedly performing the above-mentioned steps ST20 to ST22, the map information updating unit 20 applies the map update information 31 used for updating the map information from version 1.1 to 1.2 to the map information 21, and, after that, applies the map update information 32 used for updating the map information from version 1.2 to 1.3 to the updated map information to which the map update information 31 has been applied so as to create updated map information 22 of version 1.3.

When, in step ST20, determining that no yet-to-be-applied map update information is stored in the temporary storage memory 17, the map information updating unit 20 checks to see whether map update information has been applied to the map information 21 at least once (in step ST23). When determining that map update information has been applied to the map information 21 at least once, the car navigation apparatus stores the updated map information 22 in the hard disk 15 (in step ST24) In other words, the hard disk access unit 16 reads the updated map information 22 from the temporary storage memory 17, and then stores it in the hard disk 15. After that, the updated map information is sent to the source of the request for retrieval of map information (in step ST25) In other words, the car navigation apparatus reads the updated map information 22 from the temporary storage memory 17, and then sends it to either the on-screen map computation unit 10 or the route computation unit 11.

In contrast, when, in step ST23, determining that no map update information has been applied to the map information 21, the car navigation apparatus sends the map information 21 stored in the temporary storage memory 17 to the source of the request for retrieval of map information (in step ST26). In other words, the car navigation apparatus sends the map information 21 stored in the temporary storage memory 17 to either the on-screen map computation unit 10 or the route computation unit 11.

As previously explained, the map information updating system in accordance with embodiment 6 of the present invention carries out map updating processing after storing the contents of a DVD-ROM 8 in the hard disk 15. Therefore, while performing map updating processing, the map information updating system can use the DVD-ROM 8 for other intended uses, such as playback of music or video. Since the map information updating system can keep all selected pieces of map update information in the hard disk 15, when there is a necessity to update the map information, it can save itself from having to read any map update information from the DVD-ROM 8 again.

In accordance with this embodiment, one or more pieces of map update information are pre-stored in one DVD-ROM and are applied to the car navigation apparatus as needed. Instead of the DVD-ROM, a storage media, such as a small hard disk or a memory card, can be used to store the one or more pieces of map update information which can be applied to the car navigation apparatus. As an alternative, the car navigation apparatus can acquire the one or more pieces of map update information via broadcasting or via a communication link.

In accordance with this embodiment, the map information and the updated map information are stored in the same hard disk, as previously mentioned. As an alternative, they can be stored in different storage media, respectively. In addition, the map information can be stored in a storage media, such as a DVD-ROM, rather than the hard disk.

Embodiment 7

A map information updating system in accordance with embodiment 7 of the present invention is an improved version of the map information updating system in accordance with embodiment 6, and is so constructed as to, when map information stored in a hard disk of a car navigation apparatus has been already updated and is stored as updated map information, be able to further update the updated map information.

Figure 13:
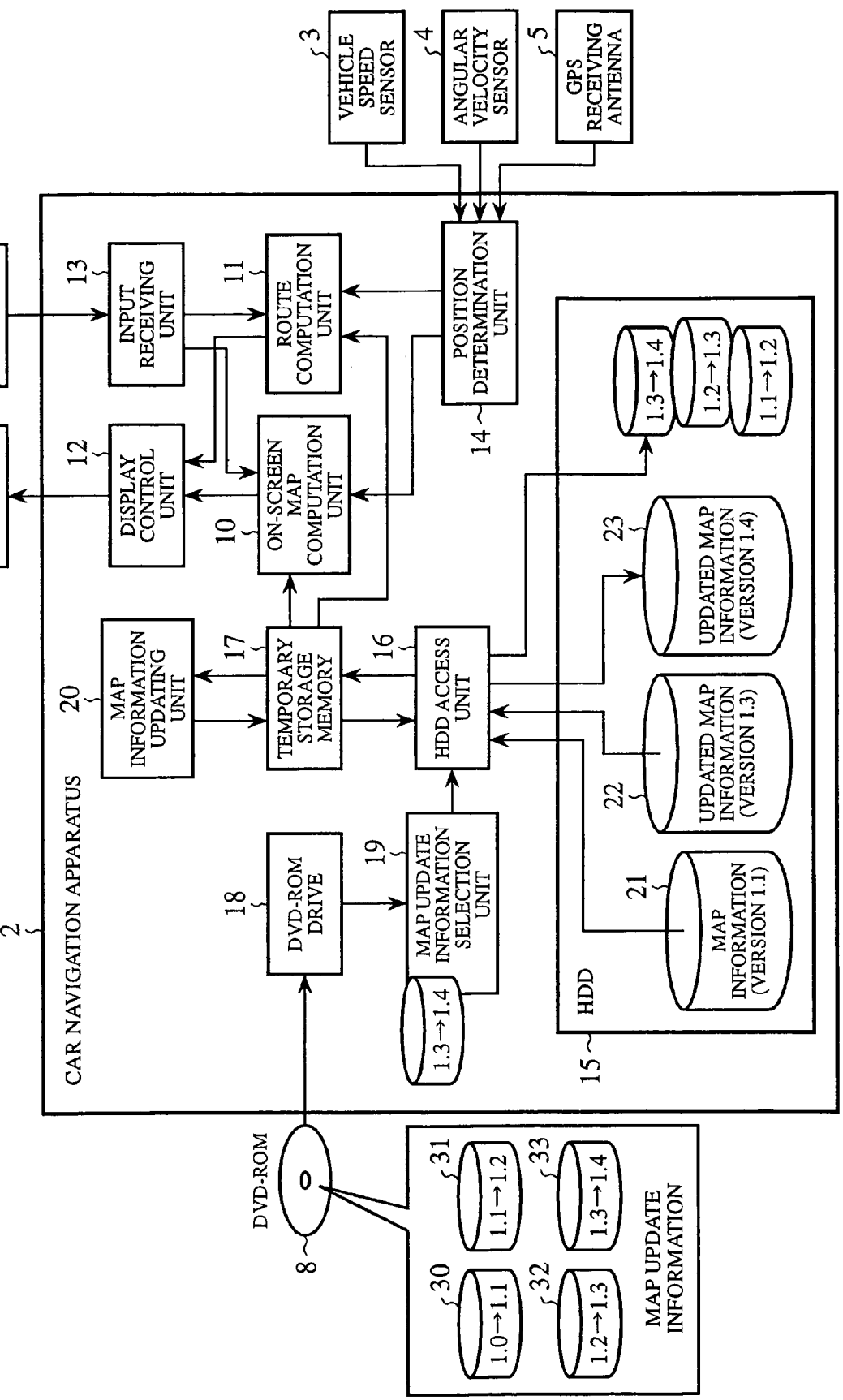
FIG. 13 is a block diagram showing the structure of a map information updating system in accordance with embodiment 7 of the present invention.

The map information updating system in accordance with this embodiment 7 has the same structure as that of above-mentioned embodiment 1. FIG. 13 is a diagram showing the structure of the map information updating system in accordance with embodiment 7 of the present invention. The map information updating system in accordance with this embodiment differs from that in accordance with embodiment 6 in that map update information 33 used for updating map information from version 1.3 to 1.4 is stored in a DVD-ROM 8 and map information of version 1.1 has already been partially updated to version 1.3 by using map update information and is stored, as updated map information 22 of version 1.3, in the hard disk 15 of the car navigation apparatus.

In the map information updating system in accordance with this embodiment 7, when the DVD-ROM 8 is inserted into a DVD-ROM drive 18, the car navigation apparatus 2 determines the version of map information 21 stored in the hard disk 15 first, and simultaneously determines the version of the latest one of all pieces of updated map information which the car navigation apparatus 2 can create by applying map update information stored in the hard disk 15 to the map information 21, by using a map update information selection unit 19. The map update information selection unit 19 then selects and retrieves one or more pieces of map update information required for updating the map information of the latest one of the determined two versions from all pieces of map update information stored in the DVD-ROM 8. In the example of FIG. 13, the map update information selection unit 19 determines the version of the map information 21 stored in the hard disk 15 as version "1.1", and also determines the version of the latest one of all pieces of updated map information, which the car navigation apparatus 2 can create by applying map update information stored in the hard disk 15 to the map information 21, as version "1.3". Therefore, one or more pieces of map update information required for updating the map information 22 of the latest version 1.3, which has been selected from the two determined versions "1.1" and "1.3", are selected from the DVD-ROM 8. In other words, the map update information 33 used for updating version 1.3 to 1.4 is selected and retrieved from the DVD-ROM 8. The map update information 33 thus selected and retrieved is stored, via a hard disk access unit 16, in the hard disk 15. When the above-mentioned processing is completed, the car navigation apparatus performs the same processing as explained in embodiment 6 so as to create updated map information 23 of version 1.4.

As previously explained, in response to a request for retrieval of map information about a map area included in already-updated map information of version 1.3 which is stored therein, the map information updating system in accordance with this embodiment 7 applies map update information 33 of version 1.4 to the updated map information of version 1.3 so as to further update the updated map information. Therefore, the number of times which map update information is applied to the existing map information can be reduced. As a result, the map information can be updated more efficiently.

In accordance with this embodiment, one or more pieces of map update information are pre-stored in one DVD-ROM and are applied to the car navigation apparatus as needed. Instead of the DVD-ROM, a storage media, such as a small hard disk or a memory card, can be used to store the one or more pieces of map update information which can be applied to the car navigation apparatus. As an alternative, the car navigation apparatus can acquire the one or more pieces of map update information via broadcasting or via a communication link.

In accordance with this embodiment, the map information and the updated map information are stored in the same hard disk, as previously mentioned. As an alternative, they can be stored in different storage media, respectively. In addition, the map information can be stored in a storage media, such as a DVD-ROM, rather than the hard disk.

Embodiment 8

A map information updating system in accordance with embodiment 8 of the present invention is so constructed as to be able to pre-install updated map information to which one or more pieces of past map update information have been applied one by one in a hard disk of a car navigation apparatus.

Figure 14:
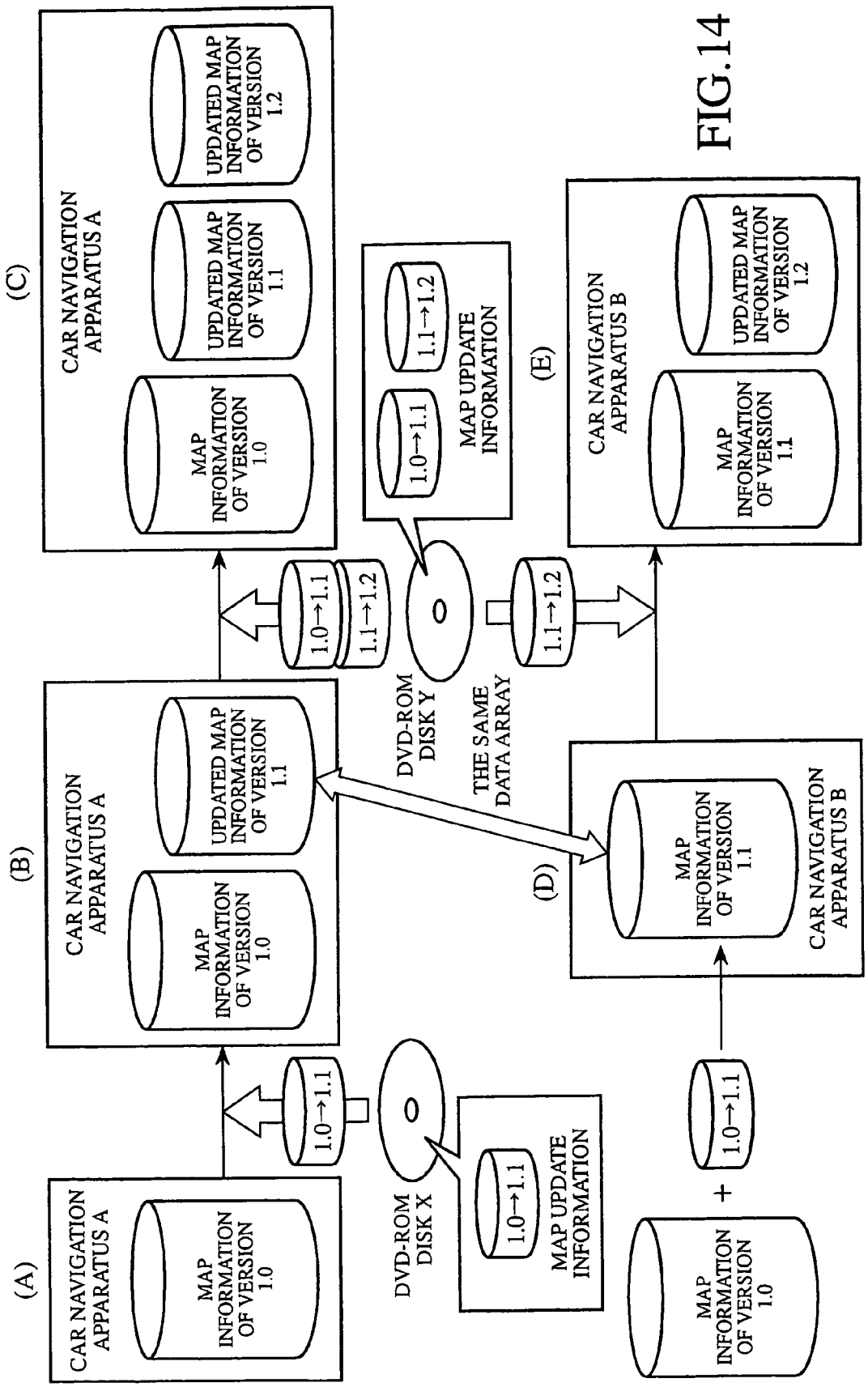
FIG. 14 is a diagram for explaining the operation of a map information updating system in accordance with embodiment 8 of the present invention.

The map information updating system in accordance with this embodiment 8 has the same structure as that of above-mentioned embodiment 1. FIG. 14 is a diagram for explaining the operation of the map information updating system in accordance with embodiment 8 of the present invention. Hereafter, it is assumed that a car navigation apparatus A is released first and, after that, a car navigation apparatus B is released.

As shown in FIG. 14A, map information of version 1.0 is pre-installed in a hard disk 15 of the car navigation apparatus A. After a predetermined updating interval since the pre-installation of the map information of version 1.0 into the car navigation apparatus A, the map information updating system creates a DVD-ROM X in which map update information used for updating version 1.0 to 1.1 is stored. By applying the DVD-ROM X to the car navigation apparatus A, the map information updating system can update the map information stored in the car navigation apparatus A from version 1.0 to version 1.1, as shown in FIG. 14B.

As shown in FIG. 14D, the updated map information which the map information updating system has created by applying the map update information used for updating the map information of version 1.0 to the one of version 1.1 to the map information of version 1.0 is pre-installed, as map information of version 1.1, in a hard disk 15 of the car navigation apparatus B which is released after the DVD-ROM X has been created. At this time, the updated map information which the car navigation apparatus A has is exactly the same as the map information which the car navigation apparatus B has. In other words, they have the same data array.

After a predetermined updating interval since the updated map information has been pre-installed into the hard disk 15 of the car navigation apparatus B, a DVD-ROM Y in which map update information used for updating the map information of version 1.1 to the one of version 1.2 is stored is created. By applying the DVD-ROM Y to the car navigation apparatus A, the map information updating system can update the map information included in the car navigation apparatus A from version 1.1 to version 1.2, as shown in FIG. 14C. By also applying the same DVD-ROM Y to the car navigation apparatus B, the map information updating system can update the map information included in the car navigation apparatus B from version 1.1 to version 1.2, as shown in FIG. 14E.

As previously explained, the map information updating system in accordance with embodiment 8 of the present invention can pre-install updated map information to which one or more pieces of past map update information have been applied one by one in a hard disk of a car navigation apparatus. Therefore, by applying an identical DVD-ROM 8 to map information contained in a car navigation apparatus which was released in a different time, the map information updating system in accordance with embodiment 8 of the present invention can update the map information.

In accordance with this embodiment, one or more pieces of map update information are pre-stored in one DVD-ROM and are applied to the car navigation apparatus as needed. Instead of the DVD-ROM, a storage media, such as a small hard disk or a memory card, can be used to store the one or more pieces of map update information which can be applied to the car navigation apparatus. As an alternative, the car navigation apparatus can acquire the one or more pieces of map update information via broadcasting or via a communication link.

Embodiment 9

A map information updating system in accordance with embodiment 9 of the present invention stores a map information updating program, as well as one or more pieces of map update information, in a DVD-ROM, and a car navigation apparatus in accordance with embodiment 9 of the present invention updates map information stored therein using this map information updating program stored in the DVD-ROM as needed.

Figure 15:
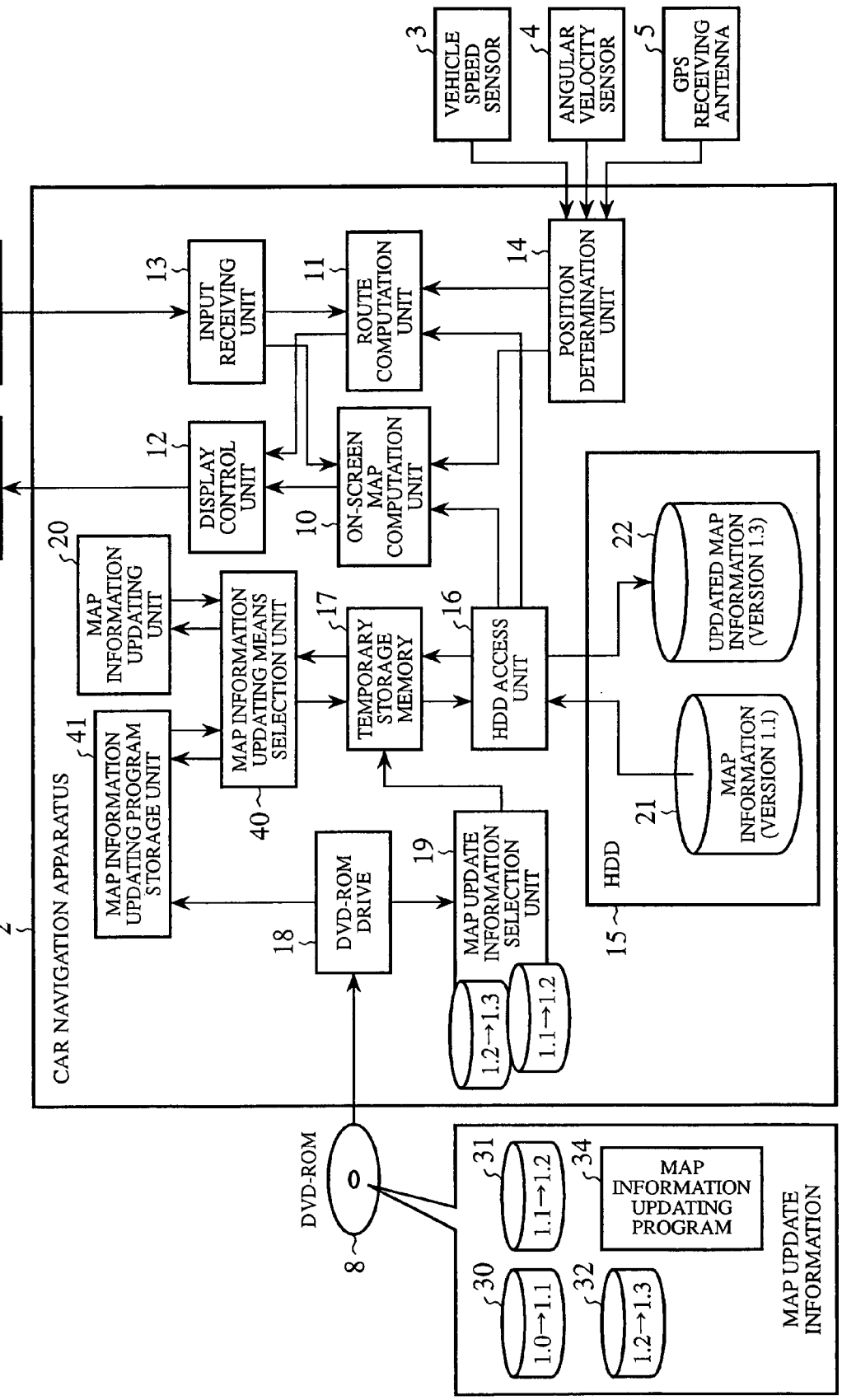
FIG. 15 is a block diagram showing the structure of a map information updating system in accordance with embodiment 9 of present invention.

FIG. 15 is a block diagram showing the structure of the map information updating system in accordance with embodiment 9 of the present invention. In accordance with the map information updating system of this embodiment, there is provided a DVD-ROM 8 in which a map information updating program, as well as map update information 30 used for updating the map information from version 1.0 to 1.1, map update information 31 used for updating the map information from version 1.1 to 1.2, and map update information 32 used for updating the map information from version 1.2 to 1.3, are recorded. The map information updating system uses the map information updating program when updating the map information using the map update information 32 used for updating version 1.2 to 1.3 and one or more pieces of map update information which are created after the map update information 32 has been created.

In addition to the structure of the car navigation apparatus in accordance with embodiment 1 (refer to FIG. 1), the car navigation apparatus 2 has a map information updating means selection unit 40 and a map information updating program storage unit 41. The map information updating means selection unit 40 selects either a map information updating unit 20 or the map information updating program stored in the map information updating program storage unit 41 in order to update the map information. The map information updating means selection unit 40 can determine which one of them to select according to one or more pieces of map update information which are to be applied to the map information. The map information updating program storage unit 41 stores the map information updating program read by a DVD-ROM drive 18.

Figure 16:
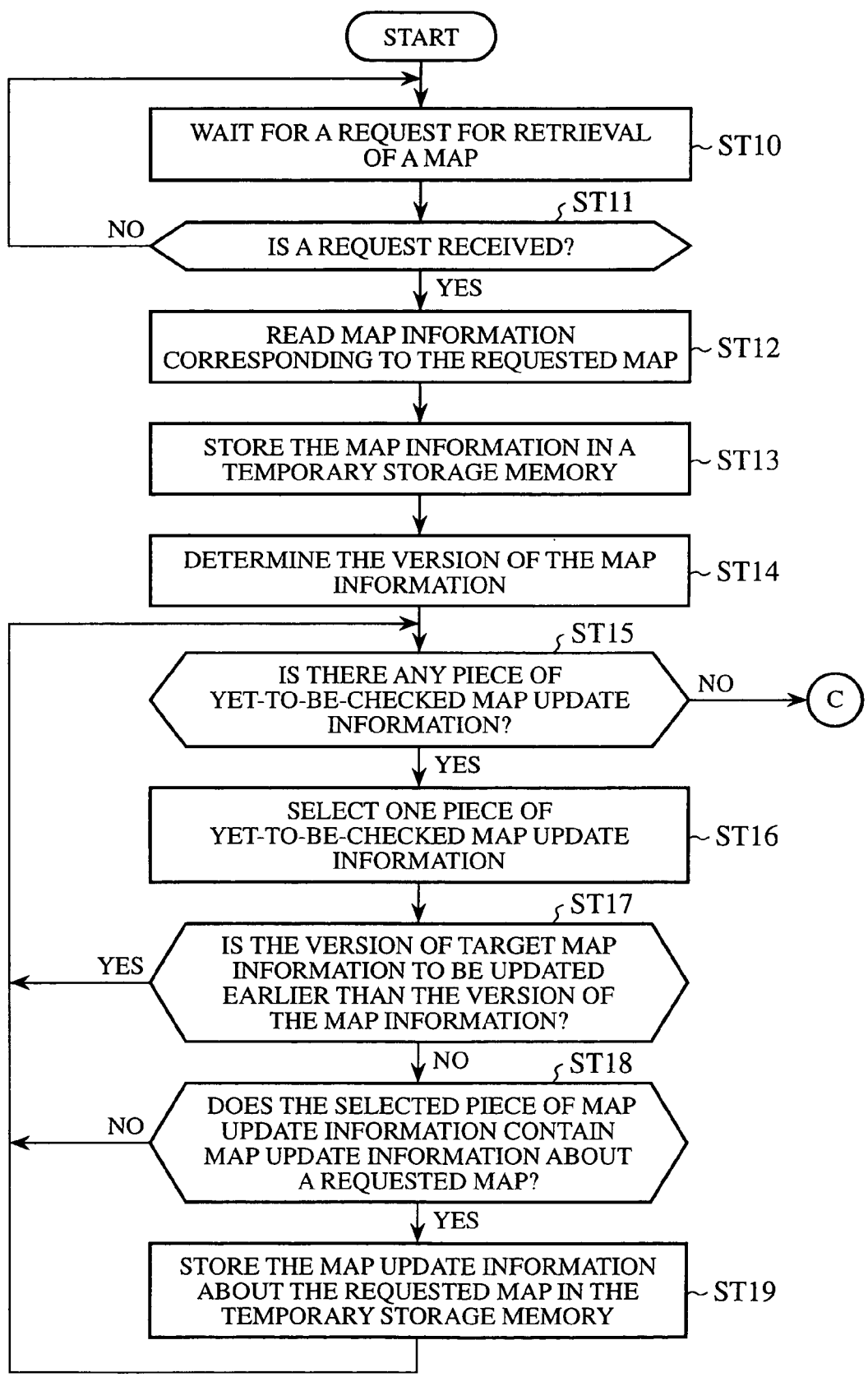
FIG. 16 is a flow chart (first portion) for explaining the operation of a car navigation apparatus which constitutes the map information updating system in accordance with embodiment 9 of the present invention.
Figure 17:
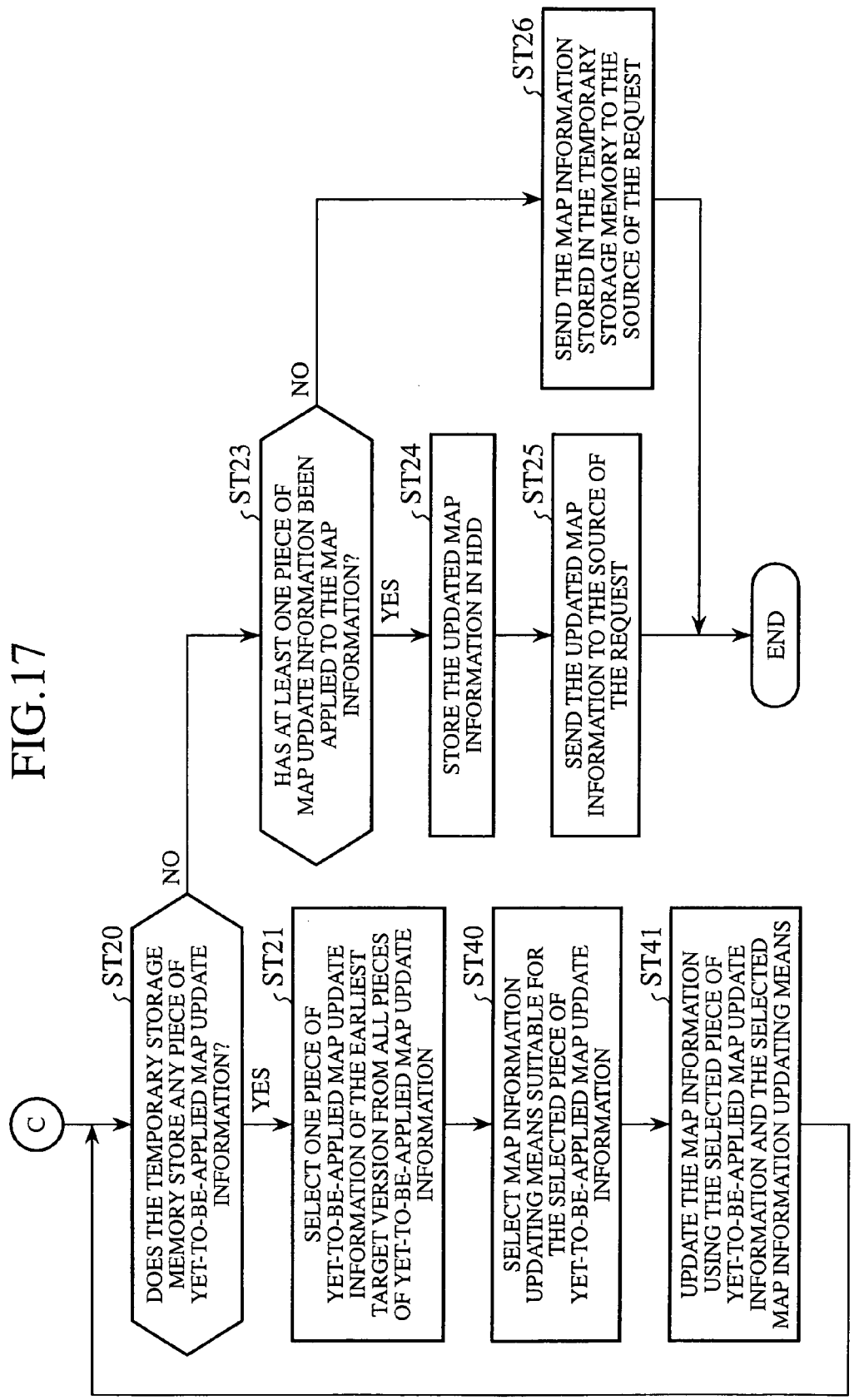
FIG. 17 is a flow chart (second portion) for explaining the operation of the car navigation apparatus which constitutes the map information updating system in accordance with embodiment 9 of the present invention.

Next, the operation of the map information updating system in accordance with embodiment 9 of the present invention, which is constituted as mentioned above, will be explained with reference to a flow chart shown in FIGS. 16 and 17. In the car navigation apparatus 2, when the DVD-ROM 8 is inserted into the DVD-ROM drive 18, the DVD-ROM drive 18 reads the map information updating program from the DVD-ROM 8, and then stores it in the map information updating program storage unit 41.

When the above-mentioned processing is completed, the car navigation apparatus 2 is placed in a state in which it is waiting for a request for retrieval of map information (in step ST10). After that, by performing processes of steps ST11 to ST19, a map update information selection unit 19 selects, retrieves and stores both the map update information 31 used for updating the map information from version 1.1 to 1.2 and the map update information 32 used for updating the map information from version 1.2 to 1.3 in a temporary storage memory 17, like that of above-mentioned embodiment 1.

After, in step ST15, determining that there is no more yet-to-be-checked map update information, the map update information selection unit 19 checks to see whether any yet-to-be-applied map update information is stored in the temporary storage memory 17 (in step ST20). When determining that one or more pieces of yet-to-be-applied map update information are stored in the temporary storage memory 17, the map update information selection unit 19 selects the map update information that can be applied to the earliest version of map information from the one or more pieces of yet-to-be-applied map update information (in step ST21). The map update information selection unit 19 then selects a map information updating unit suitable for the selected map update information (in step ST40). To be more specific, when the selected map update information is the map update information 31 used for updating version 1.1 to 1.2, the map information updating means selection unit 40 selects the map information updating unit 20, whereas when the selected map update information is the map update information 31 used for updating version 1.2 to 1.3, the map information updating means selection unit 40 selects the map information updating program 34 stored in the map information updating program storage unit 41.

Then, either the selected map information updating unit 20 or the selected map information updating program 34 updates the map information by using the selected map update information (in step ST41). After that, the car navigation apparatus 2 returns to step ST20 in which it repeatedly performs the above-mentioned processing. In the example shown in FIG. 15, by repeatedly performing the above-mentioned steps ST20 to ST22, the map information updating unit 20 applies the map update information 31 used for updating the map information from version 1.1 to 1.2 to the map information 21, and, after that, the map information updating program 34 stored in the map information updating program storage unit 41 applies the map update information 32 used for updating the map information from version 1.2 to 1.3 to the updated map information to which the map update information 31 has been applied so as to create updated map information 22 of version 1.3.

When, in step ST20, determining that no more yet-to-be-applied map update information is stored in the temporary storage memory 17, the map information updating means selection unit 40 checks to see whether map update information has been applied to the map information 21 at least once (in step ST23). When determining that map update information has been applied to the map information 21 at least once, the car navigation apparatus stores the updated map information 22 in the hard disk 15 (in step ST24). In other words, a hard disk access unit 16 reads the updated map information 22 from the temporary storage memory 17, and then stores it in the hard disk 15. After that, the car navigation apparatus sends the updated map information to the source of the request for retrieval of map information (in step ST25). In other words, the car navigation apparatus reads the updated map information 22 from the temporary storage memory 17, and then sends it to either an on-screen map computation unit 10 or a route computation unit 11.

In contrast, when, in step ST23, determining that no map update information has been applied to the map information 21, the car navigation apparatus sends the map information 21 stored in the temporary storage memory 17 to the source of the request for retrieval of map information (in step ST26). In other words, the car navigation apparatus sends the map information 21 stored in the temporary storage memory 17 to either the on-screen map computation unit 10 or the route computation unit 11.

As previously explained, the map information updating system in accordance with this embodiment 9 stores a map information updating program, as well as one or more pieces of map update information, in the DVD-ROM 8, and the car navigation apparatus 2 in accordance with this embodiment 9 updates map information according to a selected piece of map update information by using either the map information updating unit 20 or the map information updating program. Therefore, even if the map information updating unit 20 cannot handle an updating that newly occurs while the map information is repeatedly revised several times, the car navigation apparatus 2 can handle the updating by using the map information updating program stored in the DVD-ROM 8. In other words, the car navigation apparatus 2 can handle any updating which the map information updating unit 20 cannot handle by using the map information updating program which can be so designed as to handle the updating and is stored in the DVD-ROM 8.

In accordance with this embodiment 9, the map information updating program storage unit 41 is provided outside the hard disk 15. As an alternative, the map information updating program storage unit 41 can be provided inside the hard disk 15. In addition, in accordance with this embodiment 9, the map information updating program 34 which is stored in the DVD-ROM 8 is stored in the map information updating program storage unit 41 of the car navigation apparatus 2 and is used for updating the map information 21. As an alternative, the map information updating program 34 can be read and used directly from the DVD-ROM 8.

In accordance with this embodiment, one or more pieces of map update information are pre-stored in one DVD-ROM and are applied to the car navigation apparatus as needed. Instead of the DVD-ROM, a storage media, such as a small hard disk or a memory card, can be used to store the one or more pieces of map update information which can be applied to the car navigation apparatus. As an alternative, the car navigation apparatus can acquire the one or more pieces of map update information via broadcasting or via a communication link.

In accordance with this embodiment, the map information and the updated map information are stored in the same hard disk, as previously mentioned. As an alternative, they can be stored in different storage media, respectively. In addition, the map information can be stored in a storage media, such as a DVD-ROM, rather than the hard disk.

Embodiment 10

In accordance with a map information updating system of embodiment 10 of the present invention, there is provided a map update information storage medium, such as a DVD-ROM 8, in which a variation between two different versions of map information is recorded as one or more files each including map update information. The map update information storage medium is so constructed as to have a data structure in which the one or more files each having map date information and management information indicating the version of target map information, to which the map update information is to be applied to update the map information, are contained, so that the map information updating system can easily manage the version of map information stored therein.

Figure 18:
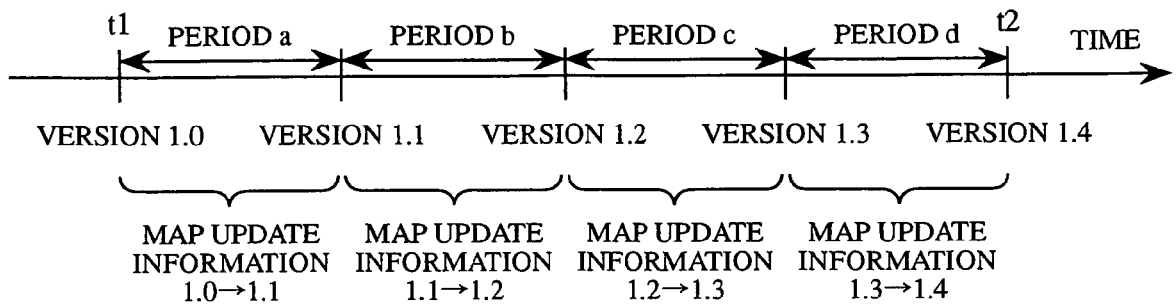
FIG. 18 is a diagram for explaining an updating interval of a map information updating system in accordance with embodiment 10 of the present invention.

Hereinafter, the data structure of the map update information storage medium will be explained in detail by taking a DVD-ROM 8 as an example of the map update information storage medium. In general, the version of the map information can be revised at predetermined intervals, e.g., every year. Hereafter, each predetermined interval is referred to as "one updating interval." When a variation between version 1.0 of map information and version 1.4 of map information is represented by some pieces of map update information, as shown in FIG. 18, a time period between t1 to t2 can be divided into some portions each of which is one updating interval. In the case of FIG. 18, the time period between t1 to t2 is divided into four continuous updating time intervals a to d. Map update information is created during each of these four updating time intervals into which the time period between t1 to t2 is divided. To be more specific, map update information used for updating version 1.0 to 1.1 is created during the first updating time interval a, map update information used for updating version 1.1 to 1.2 is created during the second updating time interval b, map update information used for updating version 1.2 to 1.3 is created during the third updating time interval c, and map update information used for updating version 1.3 to 1.4 is created during the fourth updating time interval d.

Figure 19:
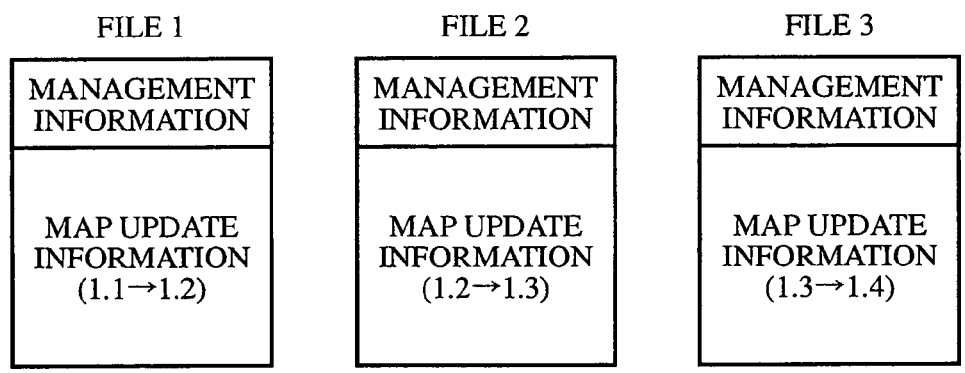
FIG. 19 is a diagram showing a data structure of a storage medium for storing map update information created by the map information updating system in accordance with embodiment 10 of the present invention.

FIG. 19 shows the data structure of an example of the DVD-ROM 8 in which three pieces of map update information created by the map information updating system in accordance with this embodiment 10 are stored. As shown in FIG. 19, one file is created at predetermined updating intervals, and a corresponding piece of map update information to which management information is added is then stored in the file. The management information specifies the version of map information to which the map update information stored in the file can be applied to update the map information. The management information can also specify the version of updated map information which is created by applying the map update information stored in the file to the map information.

For example, the DVD-ROM 8 contains a file 1 in which the map update information used for updating version 1.1 to 1.2 and corresponding management information are stored, a file 2 in which the map update information used for updating version 1.2 to 1.3 and corresponding management information are stored, and a file 3 in which the map update information used for updating version 1.3 to 1.4 and corresponding management information, which are recorded therein, as shown in FIG. 19.

As previously explained, the map information updating system in accordance with this embodiment 10 creates map update information at predetermined updating intervals. Therefore, by applying one or more pieces of map update information which have been created at predetermined updating intervals and which are recorded in the DVD-ROM 8 to map information of a certain version being held by the car navigation apparatus 2 one by one, the map information updating system can update the map information.

Embodiment 11

In accordance with a map information updating system of embodiment 11 of the present invention, there is provided a map update information storage medium, such as a DVD-ROM 8, in which a variation between two different versions of map information is recorded as one or more files each including map update information. The map update information storage medium is so constructed as to have a data structure in which the one or more files each having map date information and a file name, which serves as management information, indicating the version of target map information, to which the map update information is to be applied to update the map information, are contained, so that the map information updating system can easily manage the version of map information stored therein.

Figure 20:
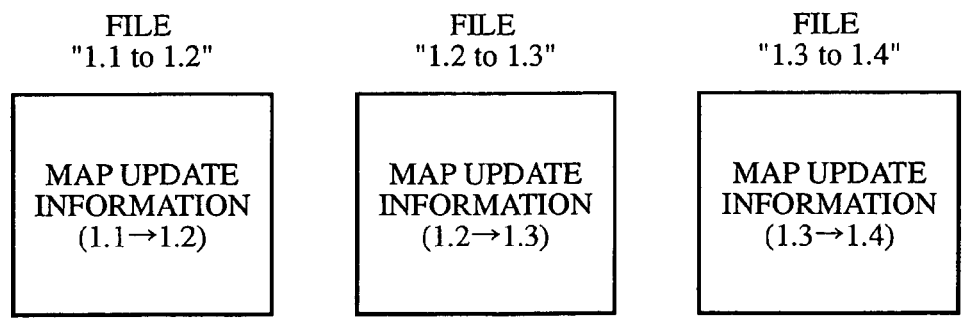
FIG. 20 is a diagram showing a data structure of a storage medium for storing map update information created by a map information updating system in accordance with embodiment 11 of the present invention.

Hereinafter, the data structure of the map update information storage medium will be explained in detail by taking a DVD-ROM 8 as an example of the map update information storage medium. FIG. 20 shows the data structure of an example of the DVD-ROM 8 in which three pieces of map update information created by the map information updating system in accordance with this embodiment 11 are stored. As shown in FIG. 20, one file is created at predetermined updating intervals, and a file name which makes it possible to uniquely specify the version of target map information to which the corresponding map update information contained in the file can be applied and the version of updated map information created by applying the corresponding map update information contained in the file to the target map information is given to the file. The map information updating system can also incorporate information specifying the version of updated map information which is created by applying the map update information contained in the file to the target map information of the previous version into the file name.

For example, the DVD-ROM 8 contains a file having a file name "1.1to1.2" and including map update information used for updating version 1.1 to version 1.2, a file having a file name "1.2to1.3" and including map update information used for updating version 1.2 to version 1.3, and a file having a file name "1.3to1.4" and including map update information used for updating version 1.3 to version 1.4, which are recorded therein, as shown in FIG. 20.

As previously explained, the map information updating system in accordance with this embodiment 11 can provide a DVD-ROM 8 in which one or more files are recorded, each of the one or more files having map date information and a file name which serves as management information and indicates the version of target map information, to which the map update information is to be applied to update the map information. Therefore, the map information updating system in accordance with embodiment 11 can reduce the amount of data stored in the DVD-ROM 8 as compared with the map information updating system in accordance with embodiment 10.

Embodiment 12

In accordance with a map information updating system of embodiment 12 of the present invention, there is provided a map update information storage medium, such as a DVD-ROM 8, in which a variation between two different versions of map information is recorded as one or more files each including only map update information and a management information file. The map update information storage medium is so constructed as to have a data structure in which the management information file indicating the version of target map information, to which each of one or more pieces of map update information is to be applied to update the map information, as well as the one or more files each including only map update information, are contained, so that the map information updating system can easily manage the version of map information stored therein.

Figure 21:
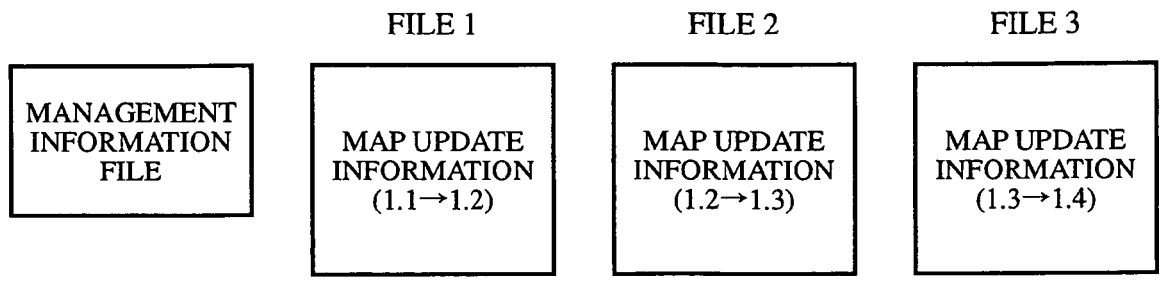
FIG. 21 is a diagram showing a data structure of a storage medium for storing map update information created by a map information updating system in accordance with embodiment 12 of the present invention.

Hereinafter, the data structure of the map update information storage medium will be explained in detail by taking a DVD-ROM 8 as an example of the map update information storage medium. FIG. 21 shows the data structure of an example of the DVD-ROM 8 in which three pieces of map update information created by the map information updating system in accordance with this embodiment 12 are stored. As shown in FIG. 21, one file that stores a piece of map update information is created at predetermined updating intervals. Information indicating the version of target map information to which the map update information stored in the file can be applied is then stored in the management information file independent of the file. Information specifying the version of updated map information which is created by applying the map update information contained in the file to the target map information of the previous version can be also stored in the management information file.

For example, the DVD-ROM 8 contains a file 1 in which map update information used for updating version 1.1 to 1.2 is stored, a file 2 in which map update information used for updating version 1.2 to 1.3 is stored, a file 3 in which map update information used for updating version 1.3 to 1.4 is stored, and the management information file including at least the three pieces of management information each indicating the version of target map information to which the map update information stored in a corresponding one of those files 1 to 3 is to be applied, which are recorded therein, as shown in FIG. 21.

As previously explained, the map information updating system in accordance with this embodiment 12 separately stores one or more files each including only map update information and the management information file including one or more pieces of management information respectively corresponding to the one or more files. Therefore, when searching for required map update information using a map update information selection unit 19, the map information updating system only has to refer to only the contents of the management information file, thereby achieving a speedup in the map information updating processing.

Embodiment 13

In accordance with a map information updating system of embodiment 13 of the present invention, there is provided a map update information storage medium, such as a DVD-ROM 8, in which a variation between two different versions of map information is recorded as a single file including one or more pieces of map update information. The map update information storage medium is so constructed as to have a data structure in which one or more data units are contained in the single file, each of the one or more data units including map date information and corresponding management information indicating the version of target map information, to which the map update information is to be applied to update the map information, so that the map information updating system can easily manage the version of map information stored therein.

Figure 22:
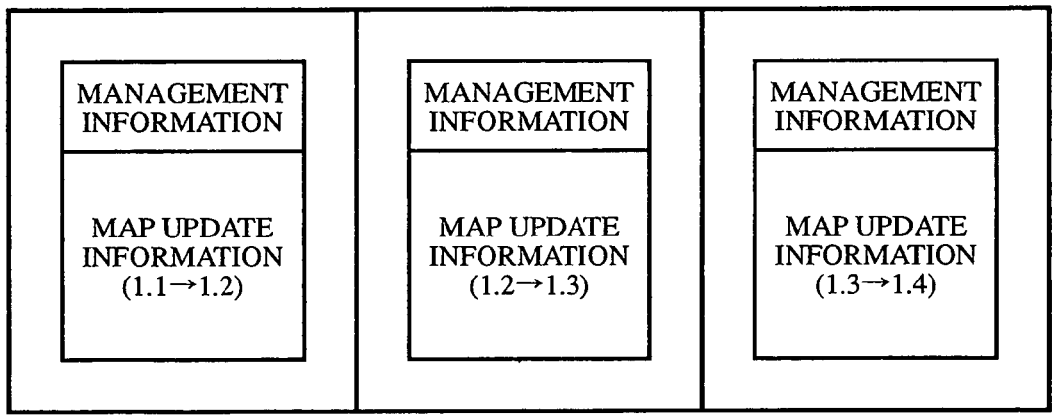
FIG. 22 is a diagram showing a data structure of a storage medium for storing map update information created by a map information updating system in accordance with embodiment 13 of the present invention.

Hereinafter, the data structure of the map update information storage medium will be explained in detail by taking a DVD-ROM 8 as an example of the map update information storage medium. FIG. 22 shows the data structure of an example of the DVD-ROM 8 in which three pieces of map update information created by the map information updating system in accordance with this embodiment 13 are stored. As shown in FIG. 22, a data unit including map update information to which management information is added is created at predetermined updating periods, and is combined with already-created data units and is stored in the single map update information file. The management information included in each data unit specifies the version of target map information which the corresponding map update information stored in each data unit is to be applied. The management information included in each data unit can also specify the version of updated map information which is created by applying the map update information contained in each data unit to the target map information of the previous version.

For example, the DVD-ROM 8 contains a data unit in which map update information used for updating version 1.1 to 1.2 and corresponding management information are included, a data unit in which map update information used for updating version 1.2 to 1.3 and corresponding management information are stored, and a data unit in which the map update information used for updating version 1.3 to 1.4 and corresponding management information, which are recorded therein, as shown in FIG. 22.

As previously explained, the map information updating system in accordance with this embodiment 13 can reduce the number of files which are stored in the DVD-ROM 8. Therefore, the map information updating system can simplify the job of creating the DVD-ROM 8. In addition, the map information updating system can achieve a speedup in the map information updating processing.

Embodiment 14

In accordance with a map information updating system of embodiment 14 of the present invention, there is provided a map update information storage medium, such as a DVD-ROM 8, in which a variation between two different versions of map information is recorded as a single file including one or more pieces of map update information. The map update information storage medium is so constructed as to have a data structure in which one or more data units each including map update information and a management information data unit including management information indicating the version of target map information, to which each of the one or more pieces of map update information is to be applied to update the map information, are contained, so that the map information updating system can easily manage the version of map information stored therein.

Figure 23:
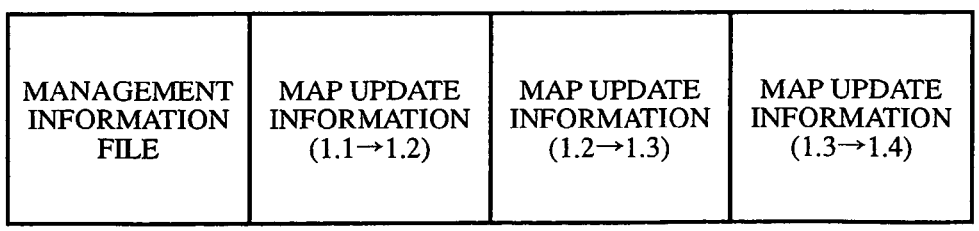
FIG. 23 is a diagram showing a data structure of a storage medium for storing map update information created by a map information updating system in accordance with embodiment 14 of the present invention.

Hereinafter, the data structure of the map update information storage medium will be explained in detail by taking a DVD-ROM 8 as an example of the map update information storage medium. FIG. 23 shows the data structure of an example of the DVD-ROM 8 in which three pieces of map update information created by the map information updating system in accordance with this embodiment 14 are stored. As shown in FIG. 23, a data unit including a piece of map update information is created at predetermined updating intervals. The version of target map information which the map update information included in the data unit is to be applied is stored in the management information data unit independent of the former data unit. Then these data units are stored in the single map update information file. Information specifying the version of updated map information which is created by applying the map update information contained in the data unit to the target map information of the previous version can be also stored in the management information data unit.

For example, the DVD-ROM 8 contains a file 1 in which map update information used for updating version 1.1 to 1.2 is stored, a file 2 in which map update information used for updating version 1.2 to 1.3 is stored, a file 3 in which map update information used for updating version 1.3 to 1.4 is stored, and the management information file including at least the three pieces of management information each indicating the version of target map information to which the map update information stored in a corresponding one of those files 1 to 3 is to be applied, which are recorded therein, as shown in FIG. 21.

As previously explained, the map information updating system in accordance with this embodiment 14 separately stores one or more data units each including only map update information and the management information data unit including one or more pieces of management information respectively corresponding to the one or more files in the single map update information file. Therefore, when searching for required map update information using a map update information selection unit 19, the map information updating system only has to refer to only the management information data unit, thereby achieving a speedup in the map information updating processing.

Embodiment 15

A map information updating system in accordance with embodiment 15 of the present invention includes a map update information creating system that is so constructed as to convert two different versions of primary map information into two pieces of secondary map information, respectively, and to create a difference between the two pieces of secondary map information as map update information.

Figure 24:
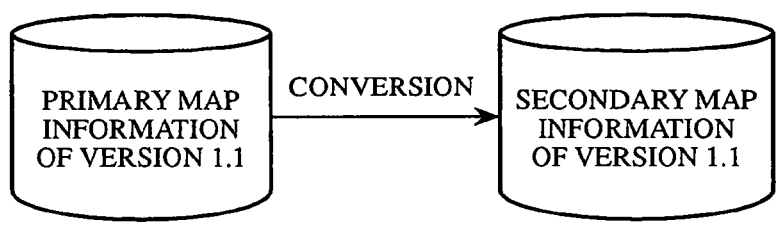
FIG. 24 is a diagram for explaining conversion of primary map information to secondary map information which is performed by a map information updating system in accordance with embodiment 15 of the present invention.

In the field of electronized map information, the map update information creating system carries out conversion of the primary map information into secondary map information, as shown in FIG. 24. The secondary map information is stored in a DVD-ROM 8 as map information and is provided for a car navigation apparatus 2. The secondary map information is then stored in a hard disk 15 of the car navigation apparatus 2. Primary map information is created based on data determined by actual measurement, aerial photographs, and so on of roads, geographic features, etc.

Figure 25:
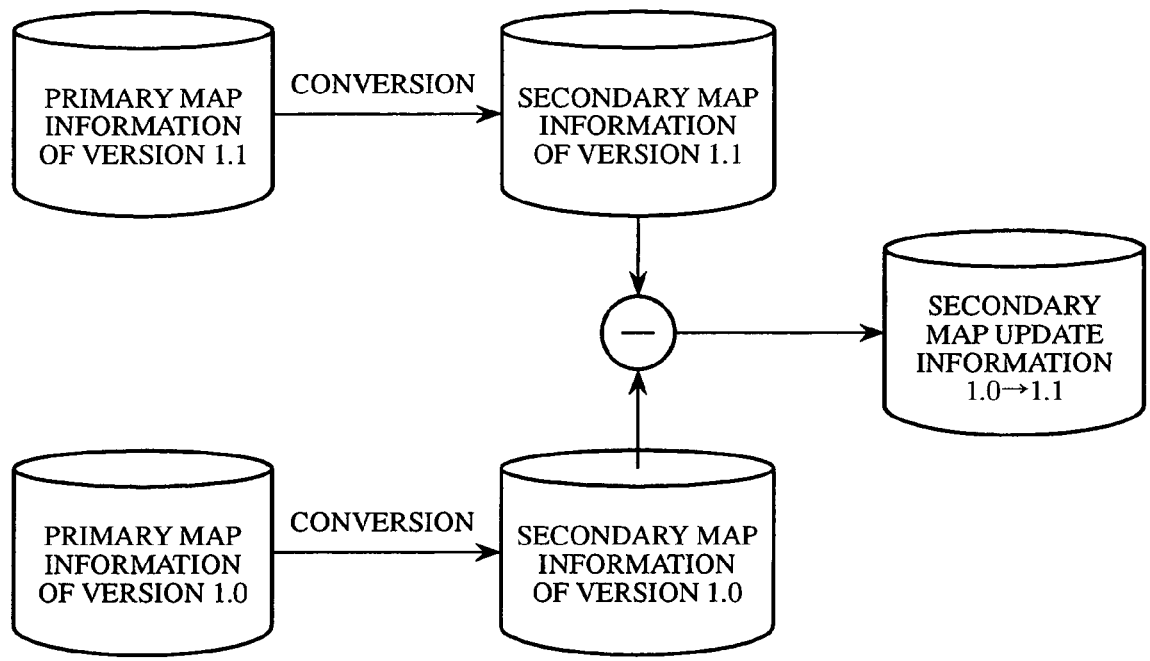
FIG. 25 is a diagram for explaining a process of creating map update information which is performed by the map information updating system in accordance with embodiment 15 of the present invention.

The map update information creating system creates map update information as follows. The map update information creating system performs predetermined conversion of primary map information of version 1.0, which is created based on the data determined by actual measurement, to secondary map information of version 1.0, as shown in FIG. 25. The map update information creating system then provides the secondary map information of version 1.0, as map information, for the car navigation apparatus 2, and the car navigation apparatus 2 stores the map information in the hard disk 15 thereof.

After a predetermined updating interval from when previous map information is stored in the car navigation apparatus 2, new primary map information of version 1.1 is created by actual measurement. The map update information creating system then performs predetermined conversion of the primary map information of version 1.1 to secondary map information of version 1.1. The map update information creating system computes a difference between the secondary map information of version 1.1 which is thus created and the existing secondary map information of version 1.0 so as to create secondary map update information used for updating version 1.0 to 1.1. The map update information creating system then records the created secondary map update information in a DVD-ROM 8 as map update information used for updating version 1.1 to 1.0, and provides the DVD-ROM 8 for the car navigation apparatus 2.

As previously explained, the map information updating system in accordance with this embodiment 15 determines a difference between two different versions of secondary map information so as to create map update information. Therefore, the map information updating system can easily create map update information.

Embodiment 16

A map information updating system in accordance with embodiment 16 of the present invention includes a map update information creating system that is so constructed as to determine a difference between two different pieces of primary map information so as to create primary map update information, and to converts this created primary map update information into secondary map update information so as to create map update information.

Figure 26:
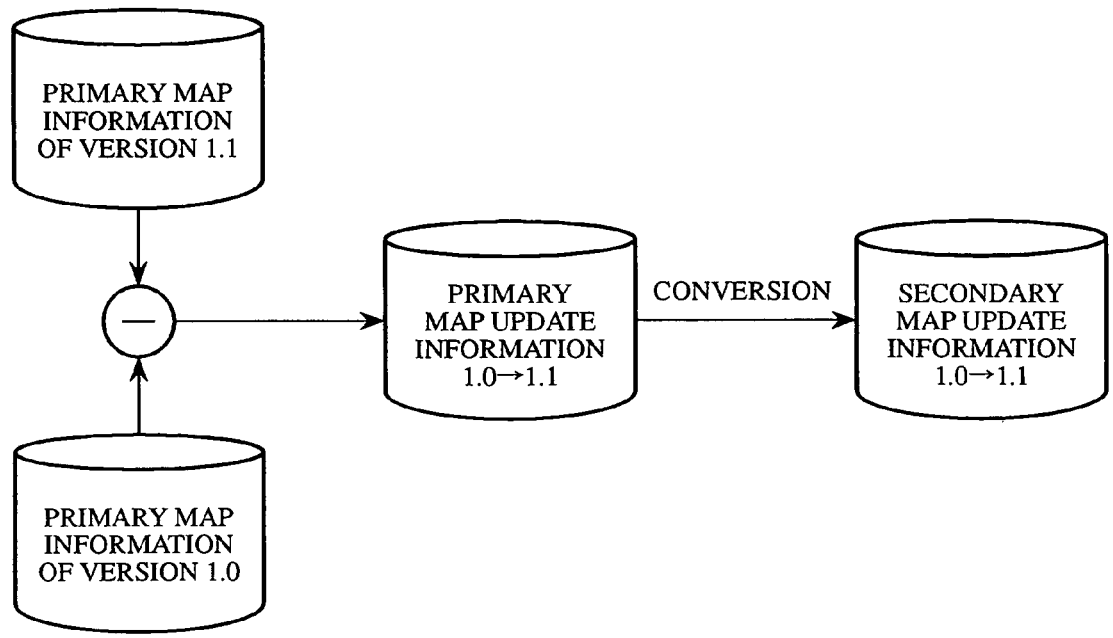
FIG. 26 is a diagram for explaining a process of creating map update information which is performed by a map information updating system in accordance with embodiment 16 of the present invention.

The map update information creating system creates map update information as follows. As shown in FIG. 26, after a predetermined updating interval from when primary map information of version 1.0 is created and stored in a car navigation apparatus 2, the map update information creating system creates primary map information of version 1.1 based on data determined by actual measurement. The map update information creating system then computes a difference between the primary map information of version 1.1 which is thus created and the existing primary map information of version 1.0 so as to create primary map update information used for updating version 1.0 to 1.1.

The map update information creating system creates secondary map update information used for updating version 1.1 to 1.0 by performing predetermined conversion of the created primary map update information. The map update information creating system then records the created secondary map update information in a DVD-ROM 8 as map update information used for updating version 1.1 to 1.0, and provides the DVD-ROM 8 for the car navigation apparatus 2.

As previously explained, the map information updating system in accordance with this embodiment 16 determine a difference between two different pieces of primary map information so as to create primary map update information, and to converts this created primary map update information into secondary map information so as to create map update information. The process of converting primary map information into secondary map information can be eliminated while the process of converting primary map update information into secondary map update information is added. Therefore, as compared with the map information updating system in accordance with above-mentioned embodiment 15, the map information updating system of embodiment 16 can reduce the total number of processes required for creating map update information and therefore can create map update information quickly and cheaply.

Updated secondary map information, which is acquired by applying the secondary map update information thus acquired to secondary map information which is the target to be updated, can have the same data array as secondary map information which can be created by conversion of corresponding revised (or updated) primary map information. Therefore, by applying an identical DVD-ROM 8 in which map update information is stored to map information contained in a car navigation apparatus which was released in a different time, the map information updating system in accordance with embodiment 16 can update the map information.

Embodiment 17

A map information updating system in accordance with embodiment 17 of the present invention includes a map update information creating system that is so constructed as to create updated primary map information by updating existing primary map information which is yet to be updated, to convert the two different versions of primary map information into two pieces of secondary map information, respectively, and to create a difference between the two pieces of secondary map information as map update information.

Figure 27:
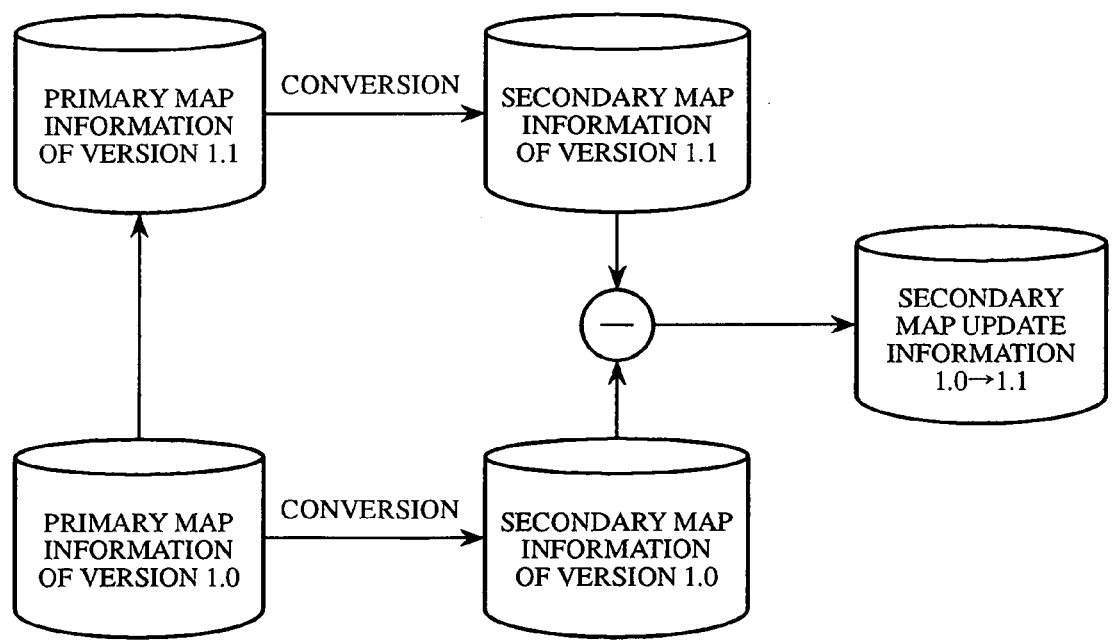
FIG. 27 is a diagram for explaining a process of creating map update information which is performed by a map information updating system in accordance with embodiment 17 of the present invention.

The map update information creating system creates map update information as follows. As shown in FIG. 27, after a predetermined updating interval from when primary map information of version 1.0 is created and stored in a car navigation apparatus 2, the map update information creating system performs updating processing, such as addition and/or deletion, on the primary map information of version 1.0 based on data about primary map update information of version 1.1 which is included in data determined by actual measurement so as to create primary map information of version 1.1.

The map update information creating system then performs predetermined conversion on the primary map information of version 1.0 so as to create secondary map information of version 1.0. This process is skipped when the secondary map information of version 1.0 already exists. The map update information creating system performs predetermined conversion on the primary map information of version 1.1 created as mentioned above so as to create secondary map information of version 1.1. The map update information creating system then computes a difference between the secondary map information of version 1.1 which is thus created and the secondary map information of version 1.0 so as to create secondary map update information used for updating version 1.0 to 1.1. The map update information creating system then records the created secondary map update information in a DVD-ROM 8 as map update information used for updating version 1.1 to 1.0, and provides the DVD-ROM 8 for the car navigation apparatus 2.

As previously explained, the map information updating system in accordance with this embodiment 17 creates updated primary map information by updating existing primary map information which is yet to be updated based on data determined by actual measurement. Therefore, the map information updating system can create primary map information easily and can create map update information quickly and cheaply.

Updated secondary map information, which is acquired by applying the secondary map update information thus acquired to secondary map information which is the target to be updated, can have the same data array as secondary map information which can be created by conversion of corresponding updated primary map information. Therefore, by applying an identical DVD-ROM 8 in which map update information is stored to map information contained in a car navigation apparatus which was released in a different time, the map information updating system in accordance with embodiment 16 can update the map information.

Many widely different embodiments of the present invention may be constructed without departing from the spirit and scope of the present invention. It should be understood that the present invention is not limited to the specific embodiments described in the specification, except as defined in the appended claims.

What is claimed is:

1. A navigation apparatus comprising:
    a map information storage unit configured to store map information containing road information;
    a map update information storage unit configured to store map update information comprised of replacement information including color information and difference information which is a difference of the map information before and after revision created for each of continuous revisions for updating the map information;
    an updated map information storage unit configured to store updated map information updated by applying the map update information;
    a map update information selection unit configured to select one or more pieces of map update information according to the version number of the map information or the updated map information in order to update the map information stored in the map information storage unit or the updated map information stored in the updated map information storage unit; and
    a map information updating unit configured to perform an update by applying the difference information selected by the map update information selection unit in chronological order of the revisions to the map information stored in the map information storage unit or the updated map information stored in the updated map information storage unit, and by replacing a part corresponding to the replacement information with the replacement information selected by the map update information selection unit.

2. The navigation apparatus according to claim 1, wherein the map information updated by the map information updating unit has the same data representation format as that of the information before updating.

3. A method of updating maps stored in a navigation apparatus comprising:
    storing map information containing road information;
    storing map update information comprised of replacement information including color information and difference information which is a difference of the map information before and after revision created for each of continuous revisions for updating the map information
    storing updated map information updated by applying the map update information;
    selecting by a computer one or more pieces of map update information according to the version number of the map information or the updated map information in order to update the stored map information or the updated map information; and updating by a computer the map information by applying the selected difference information in chronological order of the revisions to the map information or the updated map information, and by replacing a part corresponding to the replacement information with the selected replacement information.

* * * * *